US011833966B2

(12) United States Patent
Broggi

(10) Patent No.: US 11,833,966 B2
(45) Date of Patent: *Dec. 5, 2023

(54) SWITCHABLE DISPLAY DURING PARKING MANEUVERS

(71) Applicant: Ambarella International LP, Santa Clara, CA (US)

(72) Inventor: Alberto Broggi, Parma (IT)

(73) Assignee: Ambarella International LP, Santa Clara, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 17/486,161

(22) Filed: Sep. 27, 2021

(65) Prior Publication Data
US 2022/0009415 A1 Jan. 13, 2022

Related U.S. Application Data

(63) Continuation of application No. 16/672,759, filed on Nov. 4, 2019, now Pat. No. 11,173,838.

(30) Foreign Application Priority Data

Jul. 24, 2019 (IT) .......................... 102019000012813

(51) Int. Cl.
*G02B 27/01* (2006.01)
*B60R 1/00* (2022.01)

(52) U.S. Cl.
CPC ............ *B60R 1/00* (2013.01); *G02B 27/0101* (2013.01); *B60R 2300/607* (2013.01);
(Continued)

(58) Field of Classification Search
CPC ................ B60R 1/00; B60R 2300/607; B60R 2300/802; B60R 2300/806; G02B 27/0101; G02B 2027/0138
See application file for complete search history.

(56) References Cited

U.S. PATENT DOCUMENTS

2010/0070139 A1* 3/2010 Ohshima ................... B60R 1/00
701/42
2014/0118549 A1* 5/2014 Meldrum ................... B60R 1/00
348/148

(Continued)

*Primary Examiner* — Leron Beck
*Assistant Examiner* — Berteau Joisil
(74) *Attorney, Agent, or Firm* — Christopher P. Maiorana, PC

(57) ABSTRACT

An apparatus includes an interface and a processor. The interface may be configured to receive pixel data corresponding to an exterior view from a vehicle. The processor may be configured to (a) process the pixel data arranged as video frames, (b) generate video data for a display in response to the video frames, (c) store a plurality of view preferences for the display, (d) determine (i) a current location of the vehicle, (ii) a current status of the vehicle, (iii) a current maneuver being performed, and (iv) which portion of the current maneuver is being performed, and (e) generate an output signal to select a view for the display. Each view preference generally corresponds to one or more of (i) a location, (ii) a vehicle status, (iii) a maneuver, and (iv) a portion of the maneuver, when the maneuver comprises more than one portion. The processor may switch between a plurality of view preferences associated with the maneuver based on a plurality of precise locations corresponding to a plurality of portions of the maneuver. The processor may determine a current precise location within the maneuver by calculating distances using image-based localization applied to the video frames. The output signal may be generated in response to the current precise location within the maneuver and the current status matching the precise location and the vehicle status, respectively, of a particular one of the plurality of view preferences corresponding to the plurality of portions of the maneuver. The view selected may be determined based on the particular one of the plurality of view preferences.

20 Claims, 16 Drawing Sheets

(52) U.S. Cl.
CPC ... *B60R 2300/802* (2013.01); *B60R 2300/806* (2013.01); *G02B 2027/0138* (2013.01)

(56) References Cited

U.S. PATENT DOCUMENTS

2016/0368417 A1* 12/2016 Bassi ................. H04N 5/23293
2019/0164430 A1* 5/2019 Nix ......................... B60R 1/002

* cited by examiner

SWITCHABLE DISPLAY DURING PARKING MANEUVERS

This application relates to U.S. patent application Ser. No. 16/672,759, filed Nov. 4, 2019, which relates to Italian Application No. 102019000012813, filed Jul. 24, 2019, which are hereby incorporated by reference in their entirety.

FIELD OF THE INVENTION

The invention relates to vehicle camera systems generally and, more particularly, to a method and/or apparatus for implementing a switchable display during parking maneuvers.

BACKGROUND

Many vehicles are equipped with onboard cameras and an onboard display. The onboard display is capable of providing a video feed from the cameras. Conventional cameras and displays for vehicles allow a user to change the camera view displayed by pressing a button (i.e., using a mechanical button or a touchscreen interface). Pressing buttons and making decisions about which view to select is a distraction to a driver, particularly when the driver is attempting to perform a complicated driving maneuver in a tight space.

For some maneuvers, such as backing into a garage of a home, one view does not provide sufficient information for the entire maneuver. For example, a reverse camera view might be useful while entering the garage threshold, but an all-around bird's-eye view might be more useful to avoid objects once the vehicle is inside the garage. Similarly, when pulling out of a garage, an all-around bird's-eye view might be useful while inside the garage, but once the tip of the vehicle crosses the garage threshold, a forward camera view might be more useful to see oncoming vehicles. When a driver has to pay attention to all sides of the vehicle and watch for oncoming traffic, pressing buttons to select a camera view is an additional complication.

It would be desirable to implement a switchable display during parking maneuvers.

SUMMARY

The invention concerns an apparatus comprising an interface and a processor. The interface may be configured to receive pixel data corresponding to an exterior view from a vehicle. The processor may be configured to (a) process the pixel data arranged as video frames, (b) generate video data for a display in response to the video frames, (c) store a plurality of view preferences for the display, (d) determine (i) a current location of the vehicle, (ii) a current status of the vehicle, (iii) a current maneuver being performed, and (iv) which portion of the current maneuver is being performed, and (e) generate an output signal to select a view for the display. Each view preference generally corresponds to one or more of (i) a location, (ii) a vehicle status, (iii) a maneuver, and (iv) a portion of the maneuver, when the maneuver comprises more than one portion. The processor may switch between a plurality of view preferences associated with the maneuver based on a plurality of precise locations corresponding to a plurality of portions of the maneuver. The processor may determine a current precise location within the maneuver by calculating distances using image-based localization applied to the video frames. The output signal may be generated in response to the current precise location within the maneuver and the current status matching the precise location and the vehicle status, respectively, of a particular one of the plurality of view preferences corresponding to the plurality of portions of the maneuver. The view selected may be determined based on the particular one of the plurality of view preferences.

BRIEF DESCRIPTION OF THE FIGURES

Embodiments of the invention will be apparent from the following detailed description and the appended claims and drawings in which:

DETAILED DESCRIPTION OF THE EMBODIMENTS

Figure 1:
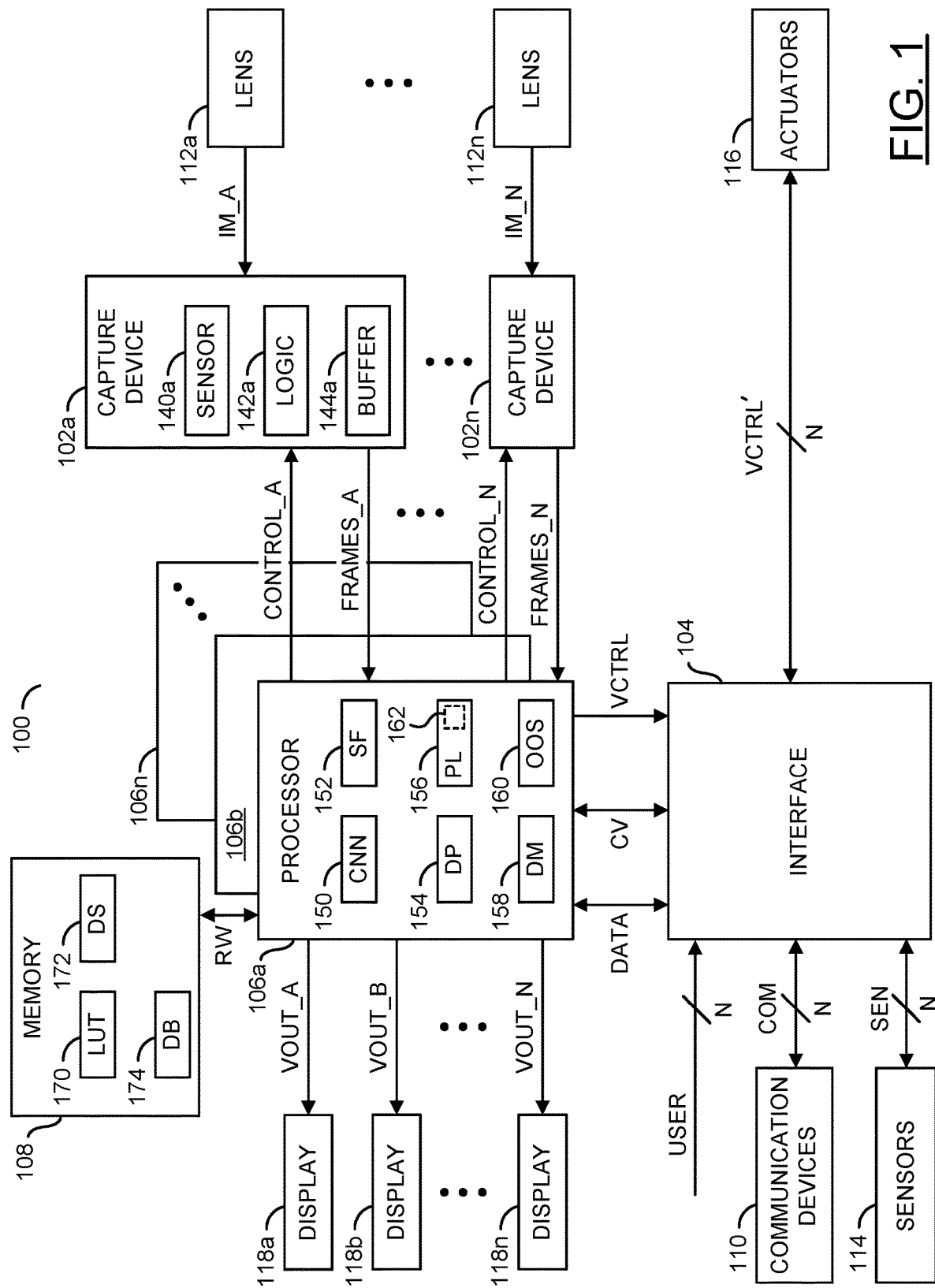
FIG. 1 is a diagram illustrating an embodiment of the present invention.

Embodiments of the present invention include providing a switchable display during parking maneuvers that may (i) improve accuracy of a parking maneuver, (ii) recognize locations, (iii) select a view based on a driver preference, (iv) enable a driver to customize a view preference, (v) recognize locations using computer vision, (vi) select a view for a display without user interaction and/or (vii) be implemented as one or more integrated circuits.

Embodiments of the present invention may provide a driver with information from different camera views while limiting distractions that may result from manually providing input to a user interface. By limiting distractions, the driver may be provided with accurate information at the right time, which may reduce driver error. Camera views may be provided to the driver according to pre-configured user preferences (e.g., user instructions) when the driver is at a known location.

Embodiments of the present invention may be configured to interface with and/or comprise a plurality of capture devices (e.g., onboard cameras) and/or a display monitor (e.g., an onboard display). The present invention may be configured to determine when to automatically switch to different views (e.g., alternate views) provided by the capture devices. When to switch views may be pre-configured by the driver. For example, the driver may provide an input that enables the invention to store (e.g., memorize) precise locations and associate particular camera views with the precise locations. Using the pre-configured views and precise locations, the next time the vehicle is in a location that corresponds with the precise location corresponding to one of the pre-configured views, the invention may be configured to automatically (e.g., without user input) switch to the desired camera view.

In order to provide a desired view to a driver, the present invention may use precise localization. Precise localization may be determined based on the use of cameras to detect a position of the ego vehicle (e.g., within a few cm of accuracy). The precise localization may be used in known locations (e.g., such as a home garage or some parking spots that may be used frequently).

Using a precise localization mechanism may enable determining a position of a vehicle within a few centimeters. In one example, the precise localization may be determined using computer vision processing on a video chip. The user (e.g., driver) may select a specific camera view (e.g., a bird's-eye view, frontal view, back view, etc.) and provide an input to memorize the specific camera view for the precise position. The user preference may be stored (e.g., location, selected gear, preferred camera view, etc.). The next time the vehicle is determined to be in the specific location and in the same gear according to the stored user preference, the display system may automatically switch to the desired camera view.

Embodiments of the present invention may implement a localization subsystem. In some embodiments, implementing GPS/GNSS alone may be sufficiently accurate (e.g., for some limited outdoor environments) and the GPS coordinates may be used to locate the ego vehicle. Localization may be obtained via a camera system (e.g., using computer vision operations). In order to uniquely determine the location of the ego vehicle, the camera system may extract features from video frames captured by the cameras installed on the ego vehicle. The features extracted may belong to objects (e.g., common objects that are generally stored in private garages) and/or pre-defined markers that the user may have previously installed at the location. The features may be extracted by implementing a processing system (e.g., a system on a chip connected to the cameras) that may be capable of processing images.

Generally, to provide the driver with desired video views precise localization may be implemented. One method of precise localization may be by implementing pre-defined markers. For example, if the driver has access to and/or full control of the area (e.g., the inside of the garage of the home of the driver), the driver may install the pre-defined markers to use as reference points. The computer vision operations may calculate distances based on a known location of the pre-defined markers. One method of precise localization may be implemented by detecting image features in video frames. For example, various stationary objects may be detected at a particular location (e.g., buildings, trees, lamp posts, etc.) that may be recognized each time the driver is at the location. Some objects may be unsuitable (e.g., pedestrians, vehicles, animals, etc.) because the object may not be detected at the location every time (e.g., different cars may be parked on the street or driving by each time the driver is at the particular location). The method of determining the precise location of the ego vehicle may be varied according to the design criteria of a particular implementation.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or blocks (or circuits) 118a-118n. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation. The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, etc. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. Details of the computer vision operations implemented by the CNN module 150 may be described in association with FIG. 4.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing, downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps and/or 4K AVC encoding. The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signal VOUT_A-VOUT_N).

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.). The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162. The circuit 162 may implement a computer vision pipeline portion. The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, blended, stitched and/or rolling shutter effect corrected versions of the signals FRAMES_A-FRAMES_N.

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

Figure 2:
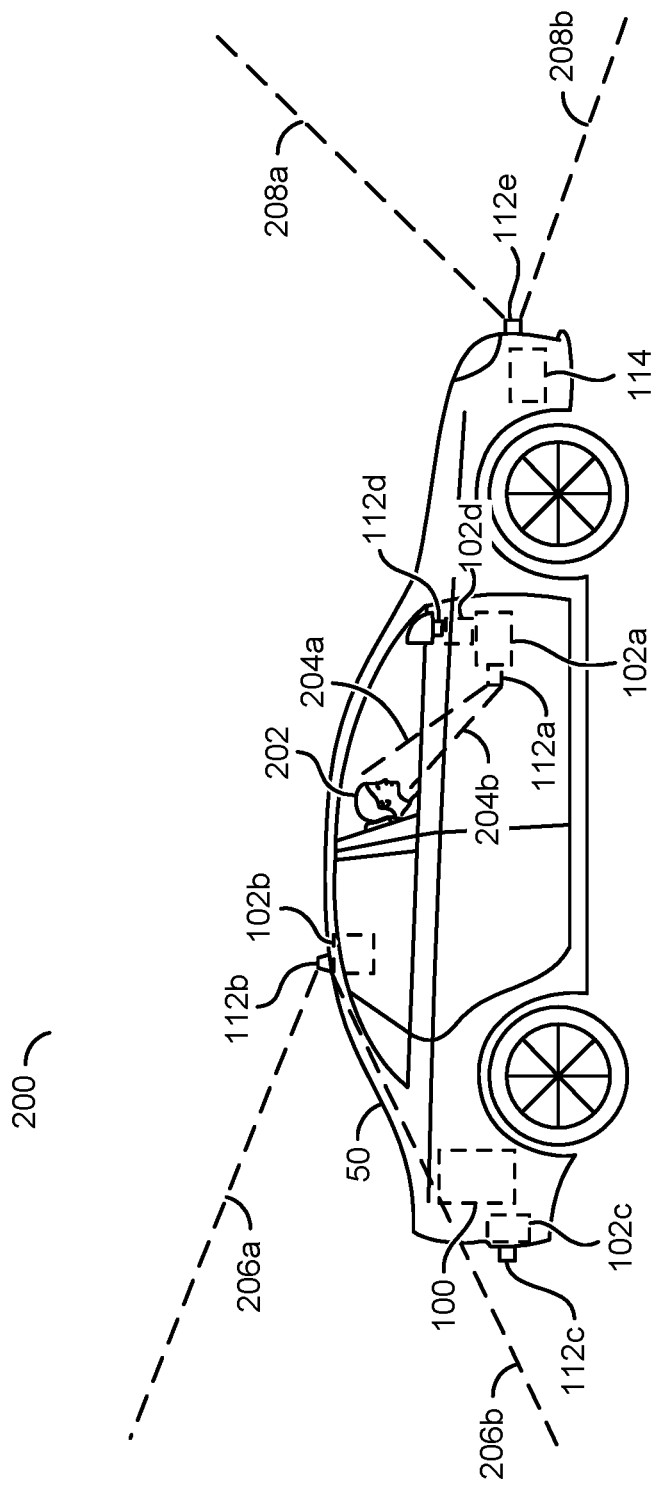
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50. In the example shown, the vehicle 50 is a car. In some embodiments, the vehicle 50 may be a truck, an ATV, an airplane, a drone, etc. The type of the vehicle 50 implementing the apparatus 100 may be varied according to the design criteria of a particular implementation.

A driver 202 is shown seated in the vehicle 50. The vehicle sensors 114 are shown on (or in) the vehicle 50. The apparatus 100 is shown in the rear of the vehicle 50. In another example, the apparatus 100 may be distributed throughout the vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation. A camera (e.g., the lens 112a and the capture device 102a) is shown capturing an interior of the vehicle 50 (e.g., detecting the driver 202). A targeted view of the driver 202 (e.g., represented by a line 204a and a line 204b) is shown being captured by the capture device 102a. The capture device 102a may also detect other objects in the vehicle 50 (e.g., a seat, a head rest, an arm rest, a rear window, a seatbelt, a center console, other occupants, etc.). By analyzing video of the driver 202 and/or other occupants of the vehicle 50 (e.g., extracting video data from the captured video), the processors 106a-106n may determine a body position and/or body characteristics (e.g., a distance, orientation and/or location of the body and/or head) of one or more occupants of the vehicle 50 and/or objects within the vehicle 50.

In some embodiments, more than one of the capture devices 102a-102n may be used to capture video data of the driver 202 and/or other occupants of the vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the vehicle 50. In the example shown, the targeted view from the vehicle 50 (e.g., represented by a line 206a and a line 206b) is shown capturing an exterior view to the rear of (e.g., an area behind) the vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the vehicle 50. The processors 106a-106n may implement computer vision to detect objects and/or understand what is happening near the vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands) and/or determine a vulnerability of an occupant (e.g., a non-moving occupant may be asleep and/or unconscious). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the vehicle 50' to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the vehicle 50'. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.). The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the vehicle 50' was parked, when the vehicle 50' came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the vehicle 50'. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
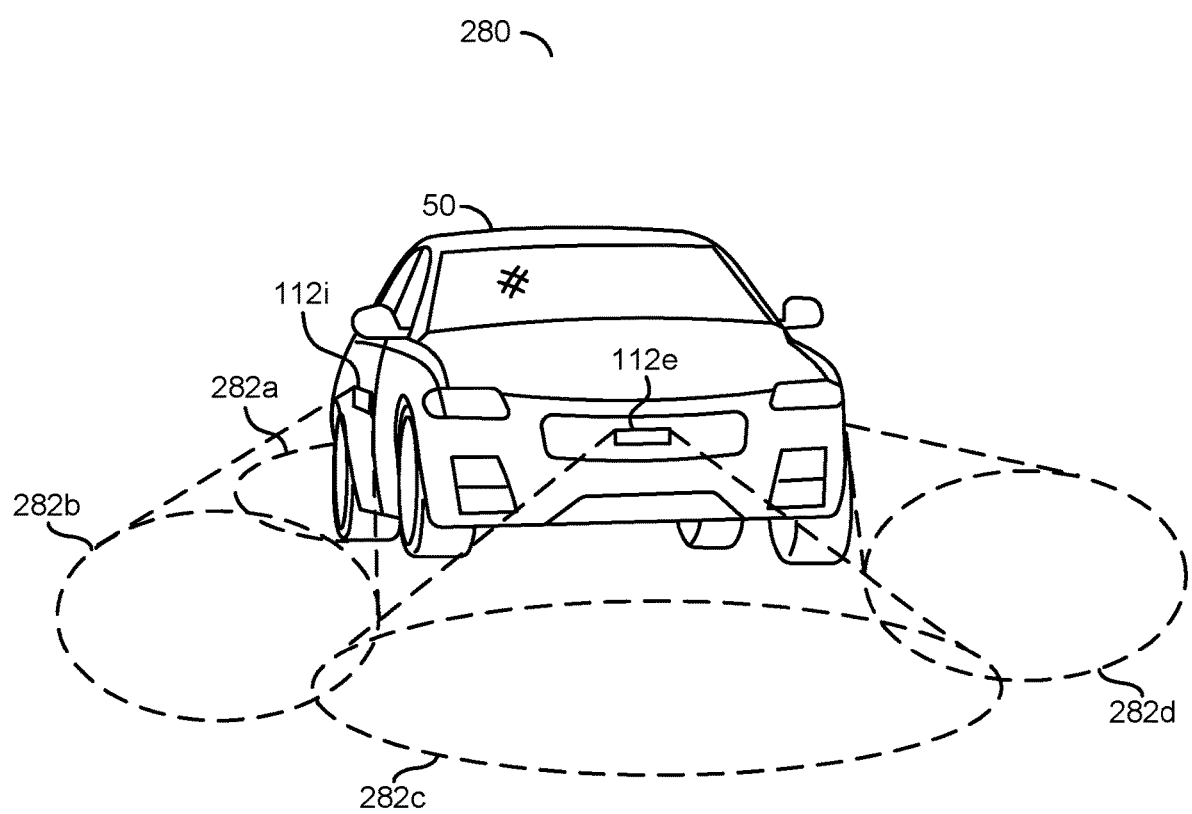
FIG. 3 is a diagram illustrating a vehicle camera system capturing an all-around view.

Referring to FIG. 3, a diagram illustrating the vehicle camera system 100 capturing an all-around view is shown. An external view 280 of the ego vehicle 50 is shown. The camera lens 112e is shown on the front grille of the ego vehicle 50. The camera lens 112i is shown on a passenger side of the ego vehicle 50.

An all-round view 282a-282d is shown. In an example, the all-round view 282a-282d may enable an all-round view (AVM) system. The AVM system may comprise four cameras. In the perspective shown in the external view 280, the lens 112e and the lens 112i may each be one of the four cameras and the other two cameras may not be visible. In an example, the lens 112e may be a camera located on the front grille of the ego vehicle 50, one of the cameras may be on the rear (e.g., over the license plate), the lens 112i may be located below the side view mirror on the passenger side and one of the cameras may be located below the side view mirror on the driver side. The arrangement of the cameras may be varied according to the design criteria of a particular implementation.

Each camera providing the all-round view 282a-282d may implement a fisheye lens (e.g., the lens 112e and the lens 112i shown may be fisheye lenses) and may capture a video frame with a 180 degrees angular aperture. The all-round view 282a-282d is shown providing a field of view coverage all around the ego vehicle 50. For example, the portion of the all-round view 282a may provide coverage for a rear of the ego vehicle 50, the portion of the all-round view 282b may provide coverage for a passenger side of the ego vehicle 50, the portion of the all-round view 282c may provide coverage for a front of the ego vehicle 50 and the portion of the all-round view 282d may provide coverage for a driver side of the ego vehicle 50. Each portion of the all-round view 282a-282d may be dewarped and stitched together by the processors 106a-106n to provide an enhanced video frame that represents a top-down view near the ego vehicle 50. The processors 106a-106n may modify the top-down view based on the all-round view 282a-282d to provide a representation of a bird's-eye view of the ego vehicle 50.

The all-round view 282a-282d may be captured by four of the capture devices (e.g., 102a-102d) implemented by camera system 100. In some embodiments, the capture devices 102a-102d may be connected to an on-board processing system (e.g., a PC, a FPGA, a DSP, an ASIC, etc.). For example, the capture devices 102a-102d may be connected to the processors 106a-106n. The video processing pipeline 156 may receive the captured video frames (e.g., images) and process the video frames to create a bird's-eye view. The processors 106a-106n may be further configured to detect special patterns (e.g., QR codes). For example, the special pattern may be posted on walls of a private garage. The processors 106a-106n may be further configured to detect image features using the computer vision operations.

The all-round view 282a-282d may be presented to the driver 202 on one or more of the displays 118a-118n in real-time. The all-round view 282a-282d may assist the driver 202 by providing a representation of the position of the ego vehicle 50 with respect to nearby obstacles that may be difficult to see because of the body of the ego vehicle 50 may obstruct the view of the driver 202. When the driver 202 is performing a maneuver near an obstacle, the all-round view 282a-282d may be one useful perspective.

In one example, when the driver 202 attempts to back up into (or leave from) a garage and/or parking space, the all-round view 282a-282d may help prevent damage to the ego vehicle 50 (or other vehicles). Backing into or pulling out of a parking spot is one example of a repeatable maneuver. While the all-round view 282a-282d may be useful for some portions of the back-in maneuver, other views may also provide helpful information to the driver 202 (e.g., the all-round view 282a-282d may not be sufficient and/or desirable for the whole maneuver). The driver 202 may prefer the all-round view 282a-282d for some parts, then switch to a single camera view for another part, and then may be to a different camera view. For example, when the driver 202 is pulling out of a garage, the driver 202 may prefer the all-round view 282a-282d while inside the garage, but as soon as the front end of the ego vehicle 50 starts to exit the garage, the desired view may be a front view (e.g., to view people or other vehicles that may be crossing in front of the garage).

Figure 4:
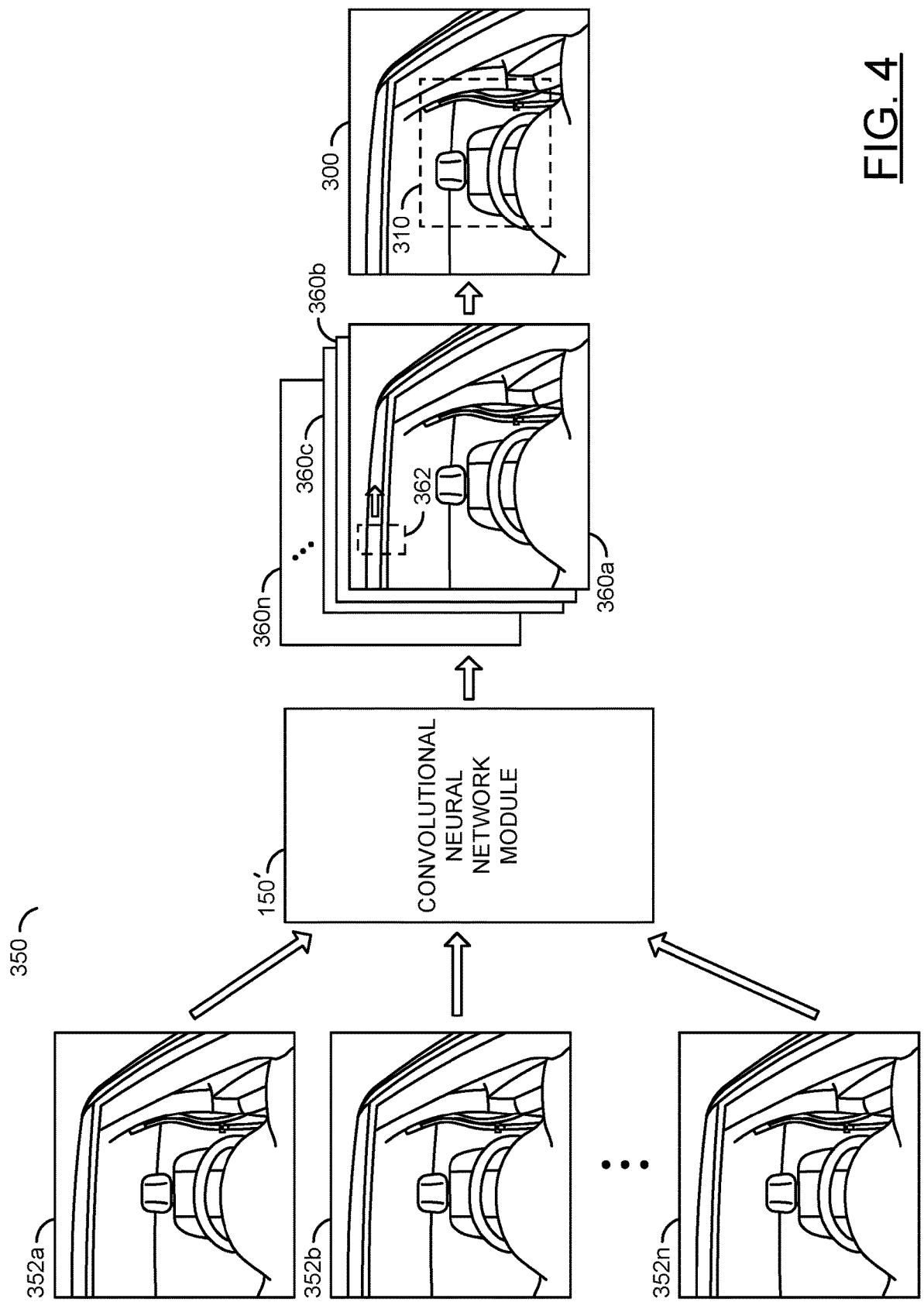
FIG. 4 is a diagram illustrating an example visualization of training a convolutional neural network for object detection using fleet learning.

Referring to FIG. 4, a diagram illustrating an example visualization 350 of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as input training data 352a-352n. However, the processors 106a-106n may be pre-trained (e.g., configured to perform computer vision before being installed in the vehicle 50). For example, the results of training data 352a-352n may be pre-programmed and/or loaded into the processors 106a-106n. In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture an unoccupied interior of a vehicle. Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 300. The reference video frame 300 may comprise masks and/or categorized instances of the reference objects 310. The reference objects 310 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

Figure 5:
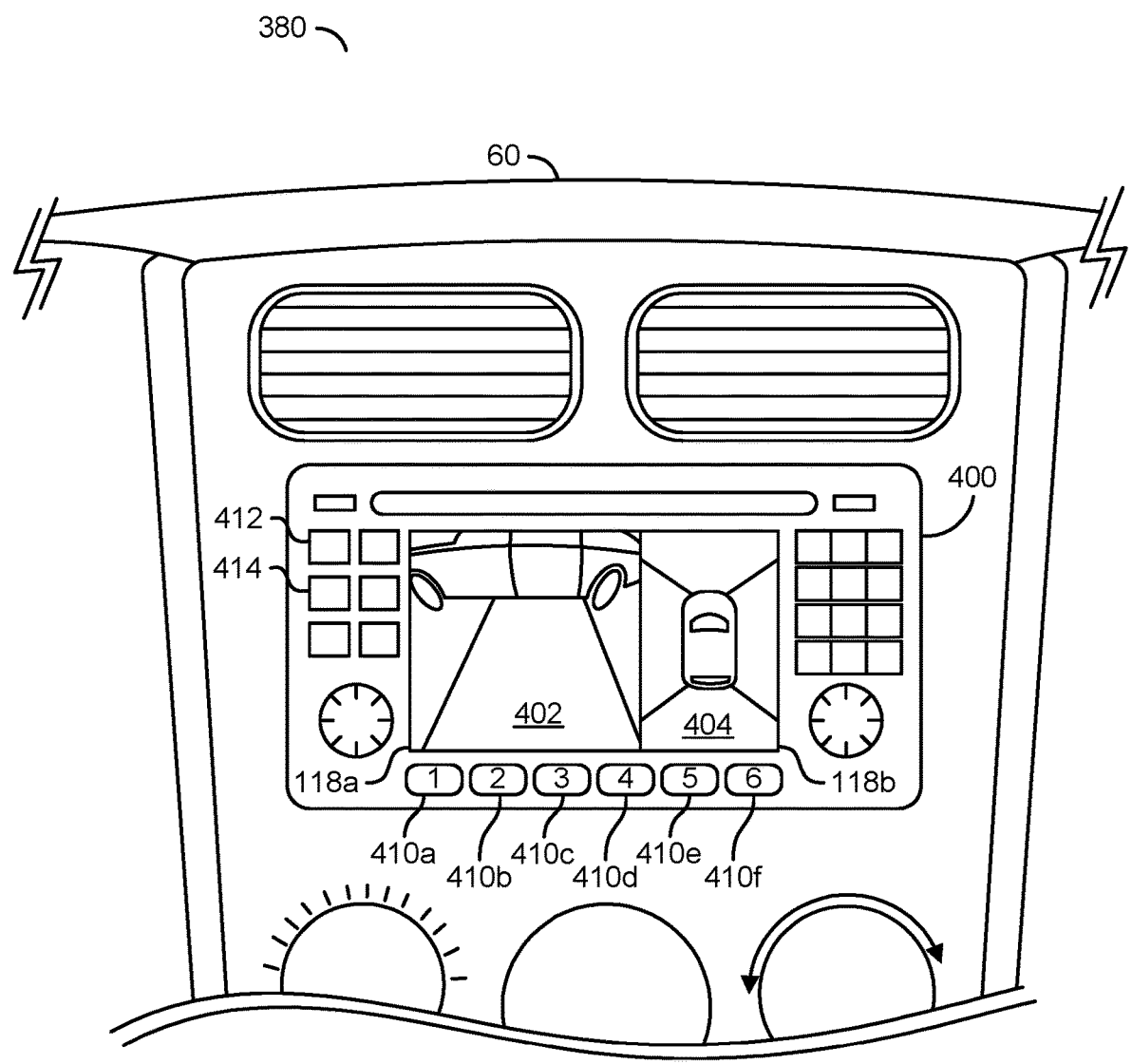
FIG. 5 is a diagram illustrating an example onboard display.

Referring to FIG. 5, a diagram illustrating an example onboard display is shown. A view 380 of a portion of an interior of the ego vehicle 50 is shown. For example, the view 380 may be a portion of the dashboard 60 of the ego vehicle 50. An infotainment system 400 is shown. In an example, the infotainment system 400 may provide a human-machine interface (HMI).

The infotainment system 400 may comprise a number of the displays 118a-118n. In the example shown, the infotainment system 400 comprises the display 118a and the display 118b. The infotainment system 400 may comprise a number of buttons 410a-410f, a button 412 and a button 414. In one example, the buttons 410a-410f, the button 412 and/or the button 414 may be software buttons implemented on a touchscreen display. Other input (e.g., buttons, dials, slots, software buttons, etc.) is shown on the infotainment system 400. The buttons 410a-410f may enable the driver 202 to select one of the available views captured by the capture devices 102a-102n (e.g., 6 available views in the example shown, but the number of views available may be varied according to the design criteria of a particular implementation). The button 412 may implement a save (or memorize) functionality. The button 414 may implement a reset functionality.

The display 118a is shown displaying a view 402 (e.g., a front view). The display 118b is shown displaying a view 404 (e.g., the top down view based on the all-round view 282a-282d shown in association with FIG. 3). In some embodiments, the infotainment system 400 may only display one view at a time. The number and/or types of video views provided by the infotainment system 400 may be varied according to the design criteria of a particular implementation.

The apparatus 100 may implement a configuration mode and a regular use mode of operation. During the configuration mode the driver 202 may select a camera view using the buttons 410a-410f (e.g., a top view, lateral view, backward view, the front view 402, the top-down view 404, etc.). If the driver 202 wants to set one of the views as the desired view, the driver 202 may press the save button 412. The processors 106a-106n may receive the view selection input in response to the buttons 410a-410f and generate the output video signal VOUT_A-VOUT_N to select the view for the displays 118a-118n in response to said view selection input.

The views available may be based on the output VOUT_A-VOUT_N presented by the processors 106a-106n and/or the views captured by the capture devices 102a-102n. Generally, at least five different views may be available (e.g., each individual portion of the all-round view 282a-282d and the top-down view generated in response to the all-round view 282a-282d). Other views may be available based on video data captured by each of the capture devices 102a-102n (including views of the interior of the ego vehicle 50). Other views may be generated by overlaying, stitching and/or dewarping the video frames FRAMES_A-FRAMES_N from one or more of the capture devices 102a-102n. The number and/or type of views available from the apparatus 100 may be varied according to the design criteria of a particular implementation.

In the configuration mode, pressing the save button 412 (e.g., a save preferences input) may cause the processor 106a-106n to store the precise, current location of the ego vehicle 50, the current gear of the ego vehicle 50 (e.g., forward, reverse, neutral, etc.) and the selected camera view in the database 174 (e.g., based on the view selected using the view selection buttons 410a-410f). In one example, the location of the ego vehicle 50 may be determined by the GPS/GNSS coordinates received from the sensor 114 (e.g., in the case when the GPS provides an accurate GPS measurement). In another example, the location of the ego vehicle 50 may be determined in response to features detected in the video frame(s) captured by the capture devices 102a-102n. Generally, the computer vision based localization determined using image features may be preferred because the image features may provide a higher accuracy of the localization. For example, low-cost GPS systems usually available on vehicles provide a location with accuracy of approximately a few meters. Image-based localization may be as precise as a few centimeters. When image-based localization is implemented, the database 174 may store a sufficient number of features in order to recognize the location again during the regular mode of operation. In one example, the processors 106a-106n may perform the computer vision precise localization to according to "Vision Only Localization", Henning Lategahn and Christoph Stiller (IEEE Transactions on Intelligent Transportation Systems, vol 15, no. 3, June 2014, pp. 1246-1257), appropriate portions of which are hereby incorporated by reference.

During the regular use mode of operation, the apparatus 100 may be configured to operate without interaction from the driver 202. The processors 106a-106n may be configured to automatically switch one or more of the displays 118a-118n to a desired camera view when a current location of the ego vehicle 50 matches the stored location for one of the camera views in the database 174. The processors 106a-106n may switch to the desired view based on the current location and the preferences of the driver 202 without the driver 202 intervening on the infotainment system 400. For example, the driver 202 may drive the ego vehicle 50 and when the decision module 158 determines that the position of the ego vehicle 50 matches one of the previously stored positions (e.g., saved by pressing the save button 412 in the configuration mode of operation) and the selected gear (e.g., the current status of the ego vehicle 50) matches the gear stored (e.g., the stored vehicle status) in the same entry of the database 174, the processors 106a-106n may select one of the video output signals VOUT_A-VOUT_N according to the same entry of the database 174 (e.g., the desired view).

In order to quickly compare a potentially large amount of data in the database 174 to the currently detected feature set in real-time, the entries in the database 174 may be filtered according to the approximate location determined by the GPS sensor 114. For example, the features detected in the incoming video frames FRAMES_A-FRAMES_N may only be compared to the filtered entries in the database 174 to limit the amount of processing performed by the processors 106a-106n. In an example, the database 174 may be filtered by the database entries that are within a pre-determined distance from the current GPS coordinates (e.g., within a few miles, within a few kilometers, within a few meters, etc.).

The infotainment system 400 (e.g., the HMI) may further provide the reset (or forget) button 414. When the driver 202 presses the save button 412, the processors 106a-106n may add an entry to the database 174 comprising the current position of the ego vehicle 50, the selected camera view (e.g., based on the input from the buttons 410a-410f) and/or the current gear (e.g., the current status determined from the CAN bus interface 104). The reset button 414 may be configured to remove entries from the database 174. In one example, in the configuration mode of operation when the driver 202 presses the reset button 414 (e.g., the processors 106a-106n receive a reset input), then the processors 106a-106n may delete any entry currently present in the database 174 that may be associated with the current position of the ego vehicle 50. In another example, when the driver 202 presses the reset button 414, then the processors 106a-106n may delete multiple entries in the database 174 that correspond to a pre-determined radius from the current position of the ego vehicle 50 (e.g., the radius may be a user-selected variable).

The storage of the current location of the ego vehicle 50 using the image features may be possible when there is a sufficient number of image features detected by the processors 106a-106n. In some embodiments, the apparatus 100 may be configured to implement the CNN module 150 to perform the feature detection used to extract the image features and/or the object detection. In some embodiments, the apparatus 100 may be configured to implement the computer vision pipeline portion 162 to perform the computer vision algorithm in order to perform the feature detection used to extract the image features and/or the object detection. Generally, any descriptions of the feature detection, the object detection and/or the extraction of the image features by the processors 106a-106n (or the apparatus 100) may be applicable to embodiments of the apparatus 100 that implement the CNN module 150 and/or the computer vision pipeline portion 162. The implementation of the image feature detection and/or the object detection by the processors 106a-106n may be performed by dedicated hardware (e.g., performed on-chip and without uploading data to an external computing resource such as a cloud processing server). The implementation of the image feature detection and/or the object detection by the apparatus 100 may be varied according to the design criteria of a particular implementation.

Localization may be unreliable with insufficient image features. To indicate to the driver 202 that the captured video frames FRAMES_A-FRAMES_N have been analyzed by the processors 106a-106n and comprise enough of the image features to provide the precise localization, the signal VCTRL may be generated to initiate an audio message (e.g., one of the actuators 116 may be a speaker). The processors 106a-106n may be configured to reject storing image features sets with insufficient image features (e.g., the location may not be clearly identifiable because the environment is too dark, the capture devices 102a-102n are dirty, the view of the capture devices 102a-102n is obstructed, the capture devices 102a-102n are too close to objects, etc.).

To prevent driver distraction and/or avoid inconsistent use, the apparatus 100 may be configured to enable the user to interact with the infotainment system 400 when the ego vehicle 50 is moving at a low speed or stopped. For example the processors 106a-106n may be configured to lock out input from the buttons 410a-410f, the save button 412 and/or the reset button 414 when the ego vehicle 50 is traveling above a threshold speed (e.g., 5 km/h). In some embodiments, the infotainment system 400 may implement a touch screen interface (e.g., software buttons). The touchscreen interface for the infotainment system 400 may collapse (e.g., combine) the two buttons 412-414 into a single button that changes functionality (e.g., the save input and/or the reset input) in response to a context. For example, the combined software button may be considered "pressed" when the ego vehicle 50 is in an identified location, and "not pressed" in other cases. For example, when the precise location of the ego vehicle 50 matches one of the entries of the database 174, then the combined software button moves automatically to the "pressed" position (e.g., eventually emitting a sound to notify the driver 202 that a known location has been reached) and the apparatus 100 may switch to the preferred camera view. In another example, when the driver 202 wants the apparatus 100 to forget a particular camera switch (e.g., delete one of the entries in the database 174), the driver 202 may press the combined software button again and bring the combined software button to the "non pressed" state.

Figure 6:
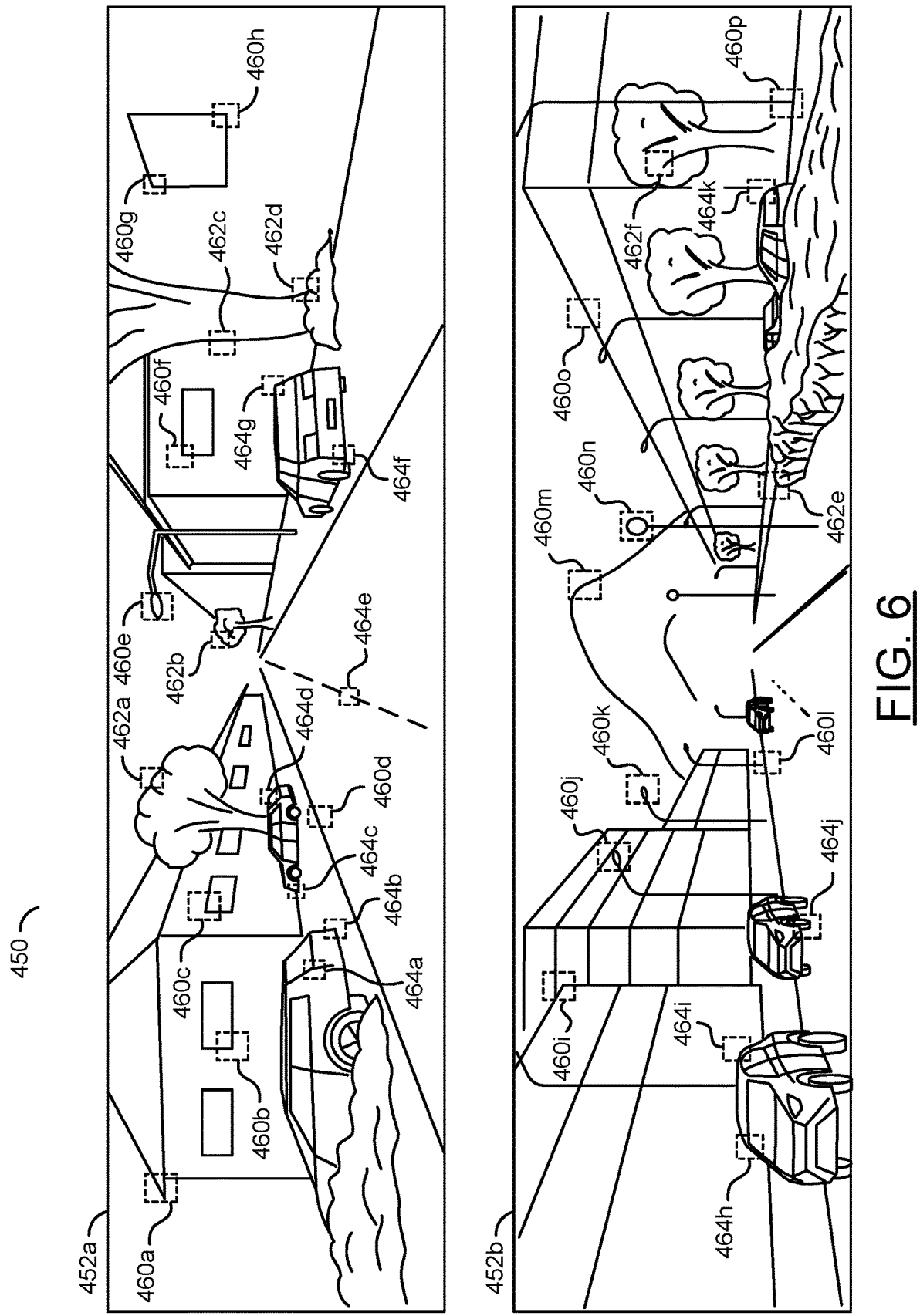
FIG. 6 is a diagram illustrating feature detection on example video frames.

Referring to FIG. 6, a diagram illustrating feature detection on example video frames is shown. A dual view 450 is shown. The dual view 450 may comprise video frames 452a-452b. The video frames 452a-452b may be representative examples of video frames captured by the capture devices 102a-102n. For example, the video frames 452a-452b may be two of the video frames FRAMES_A-FRAMES_N corresponding to an area outside of the ego vehicle 50. In the example shown, the video frame 452a may be a forward view from the perspective of the ego vehicle 50 and the video frame 452b may be a reverse view from the perspective of the ego vehicle 50. In an example, the video frames 452a-452b may be captured at the same time (e.g., the video frame 452a may represent a forward view and the video frame 452b may be a reverse view for a particular location of the ego vehicle 50). The processors 106a-106n may be configured to generate the video frames 452a-452b for use by one or more of the displays 118a-118n. The processors 106a-106n may be configured to generate the video frames 452a-452b in order to perform the feature detection to determine the precise localization of the ego vehicle 50.

Dotted boxes 460a-460p are shown on the video frames 452a-452b. Dotted boxes 462a-462f are shown on the video frames 452a-452b. Dotted boxes 464a-464k are shown on the video frames 452a-452b. The dotted boxes 460a-460p, the dotted boxes 462a-462f and/or the dotted boxes 464a-464k may be objects and/or image features detected by the processors 106a-106n. For example, the capture devices 102a-102n may capture the environment around the ego vehicle 50 and provide the video frames FRAMES_A-FRAMES_N to the processors 106a-106n and then the CNN module 150 and/or the computer vision pipeline portion 162 may analyze the video frames and identify the image features 460a-460p, 462a-462f and/or 464a-464k. The image features 460a-460p, 462a-462f and/or 464a-464k shown on the video frames 452a-452b may be representative examples. The number, type and/or location of each of the image features 460a-460p, 462a-462f and/or 464a-464k may be varied according to the design criteria of a particular implementation.

The image features 460a-460p, 462a-462f and/or 464a-464k may represent objects and/or identifiable patterns in the video frames 452a-452b detected by performing the computer vision operations. The computer vision operations performed by the processors 106a-106n may be configured to extract the image features 460a-460p, 462a-462f and/or 464a-464k from the video frames 452a-452b. For example, the processors 106a-106n may detect the image features 460a-460p, 462a-462f and/or 464a-464k by analyzing the incoming video frames in real time. The image features 460a-460p, 462a-462f and/or 464a-464k may be used by the processors 106a-106n for various features performed by the apparatus 100 (e.g., collision avoidance, lane departure assistance, autonomous driving, generating video data for electronic mirrors, providing warnings to the driver 202, etc.). For example, the image features 460a-460p, 462a-462f and/or 464a-464k may be used for various functionality of the apparatus 100 in addition to the precise localization.

The image features 460a-460p, 462a-462f and/or 464a-464k may be data extracted from the video frames 452a-452b by the computer vision operations. The image features 460a-460p, 462a-462f and/or 464a-464k may be automatically selected by the processors 106a-106n. For example, the image features 460a-460p, 462a-462f and/or 464a-464k may be encode points of the video frames 452a-452b that have a particularly high quantity of information (e.g., corners or points of high luminance contrast). The image features 460a-460p, 462a-462f and/or 464a-464k may encode position and image content.

The image features 460a-460p may be invariant features (e.g., static features). The invariant features 460a-460p may be image features that may not or are unlikely to change with respect to the location. In the example shown, the invariant feature 460a may be a portion of a building. In another example, the invariant feature 460c may be a window on a building. In yet another example, the invariant feature 460e may be a street light. In still another example, the invariant feature 460m may be a mountain in the landscape. The invariant features 460a-460p may remain the same size when viewed from a particular location. The invariant features 460a-460p may be reliable features in the captured video frames used by the processors 106a-106n to determine the precise localization.

The image features 462a-462f may be movable features. The movable features 462a-462f may be moderately reliable image features, but may change over time. In the example shown, the movable feature 462a is a tree (the tree may be unlikely to move but may grow with time). In another example, the movable feature 462e may be a bush (the bush may grow or be trimmed over time). The movable features 462a-462f may provide some assistance for localization. However, the movable features 462a-462f may be unreliable long term due to a high likelihood of changing size/shape and may not be the same size when viewed from a particular distance.

The image features 464a-464k may be unreliable image features. The unreliable image features 464a-464k may be likely to change each time the ego vehicle 50 is at a particular location. In the example shown, the unreliable feature 464a may be a parked vehicle. Even though the parked vehicle may commonly be parked in a particular driveway, the parked vehicle may be commonly moved (e.g., not home, parked in a different spot, replaced by another car, etc.). In another example, the unreliable feature 464e may be a road marking. Road markings may be changed (e.g., a turning lane is added, a bike lane is added, etc.). Other examples of unreliable features may be pedestrians, cyclists and/or shadows. The unreliable features 464a-464k may be image features that may not be the same size when viewed from a particular location and/or may not be present each time the ego vehicle 50 is at a particular location. The unreliable features 464a-464k may not be used by the processors 106a-106n to perform the localization.

In some embodiments, the decision module 158 may be configured to distinguish between the invariant features 460a-460p, the movable features 462a-462f and the unreliable markers 464a-464k. The CNN module 150 may then determine the type of objects detected and based on the type and/or classification of object recognized (e.g., building, tree, pedestrian, etc.), the decision module 158 may determine whether or not to use the image features to determine the localization.

In some embodiments, the computer vision operations performed by the portion 162 may be configured to implement a feature matcher. The feature matcher may be configured to match the image features that correspond to the invariant features 460a-460p. The feature matcher may be configured to reject the image features that do not match (e.g., the movable features 462a-462f and/or the unreliable markers 464a-464k). In one example, the processors 106a-106n may reject the image features that do not match according to "Robust Feature Matching for Loop Closing and Localization", Jungho Kim and In-So Kweon (Proceedings of the 2007 IEEE/RSJ International Conference on Intelligent Robots and Systems, Oct. 29-Nov. 2, 2007), appropriate portions of which are hereby incorporated by reference.

The processors 106a-106n may use the invariant features 460a-460p to perform the precise localization. In one example, the processors 106a-106n may use the movable features 462a-462f to determine the localization depending on the context (e.g., how much time has passed, the likelihood that the object has changed shape, etc.). In another example, the processors 106a-106n may reject the movable features 462a-462f (e.g., the movable features 462a-462f may not be used to determine the precise localization). The processors 106a-106n may not use the unreliable features 464a-464k for the localization.

The invariant image features 460a-460p may be used by the processors 106a-106n to determine the precise localization of the ego vehicle 50 when located in a public location (e.g., where the driver 202 does not have control over the environment). In one example, the processors 106a-106n may perform the localization using the image features 460a-460p compared to previously stored image features as described in "Learning Deep Features for Scene Recognition using Places Database", Bolei Zhou, et al. (Advances in Neural Information Processing Systems 27 (NIPS), 2014), appropriate portions of which are hereby incorporated by reference. The specific collection of invariant image features 460a-460p (e.g., image features that are invariant with respect to the scene) may be stored by the database 174. The processors 106a-106n may be configured to identify whether detected image features in a currently captured video frame matches the invariant image features 460a-460p stored in the database 174 (e.g., to identify the location based on a set of previously seen locations). Image features in the current video frame that are outliers (e.g., image features that correspond to the unreliable image features 464a-464k such as movable objects and features generated by artifacts like reflections and/or different lighting) may be automatically identified by the processors 106a-106n and removed by the feature matching performed by the decision module 158.

The precision of the localization performed by the processors 106a-106n using the invariant image features 460a-460p may be as close as a few centimeters. The processors 106a-106n may be configured to extract the invariant image features 460a-460p from a current video frame and then compare the invariant image features 460a-460p of the current video frame to the stored image features from the database 174 (e.g., a subset of all the database entries filtered by the coarse GPS coordinates and/or odometry of the ego vehicle 50). For example, when the current invariant image features 460a-460p match the stored image features then the processors 106a-106n may decide that the current location of the ego vehicle 50 may be within a few centimeters of the stored location.

In some embodiments, the decision module 158 may select inliers (e.g., the invariant image features 460a-460p that match one of the entries of the database 174) and outliers (e.g., the unreliable features 464a-464k of the current video frame such as objects that were not present in the scene at the time when the database was generated). Using the inliers for the invariant image features 460a-460p, the processors 106a-106n may perform a best fitting of the image data for the current video frame with the data (e.g., stored image features) in the entry of the database 174 in order to identify the camera pose (e.g., extrinsic camera parameters such as 3 degrees of freedom for position and 3 degrees of freedom for orientation). The intrinsic parameters of the capture devices 102a-102n may be assumed to be calibrated.

Figure 7:
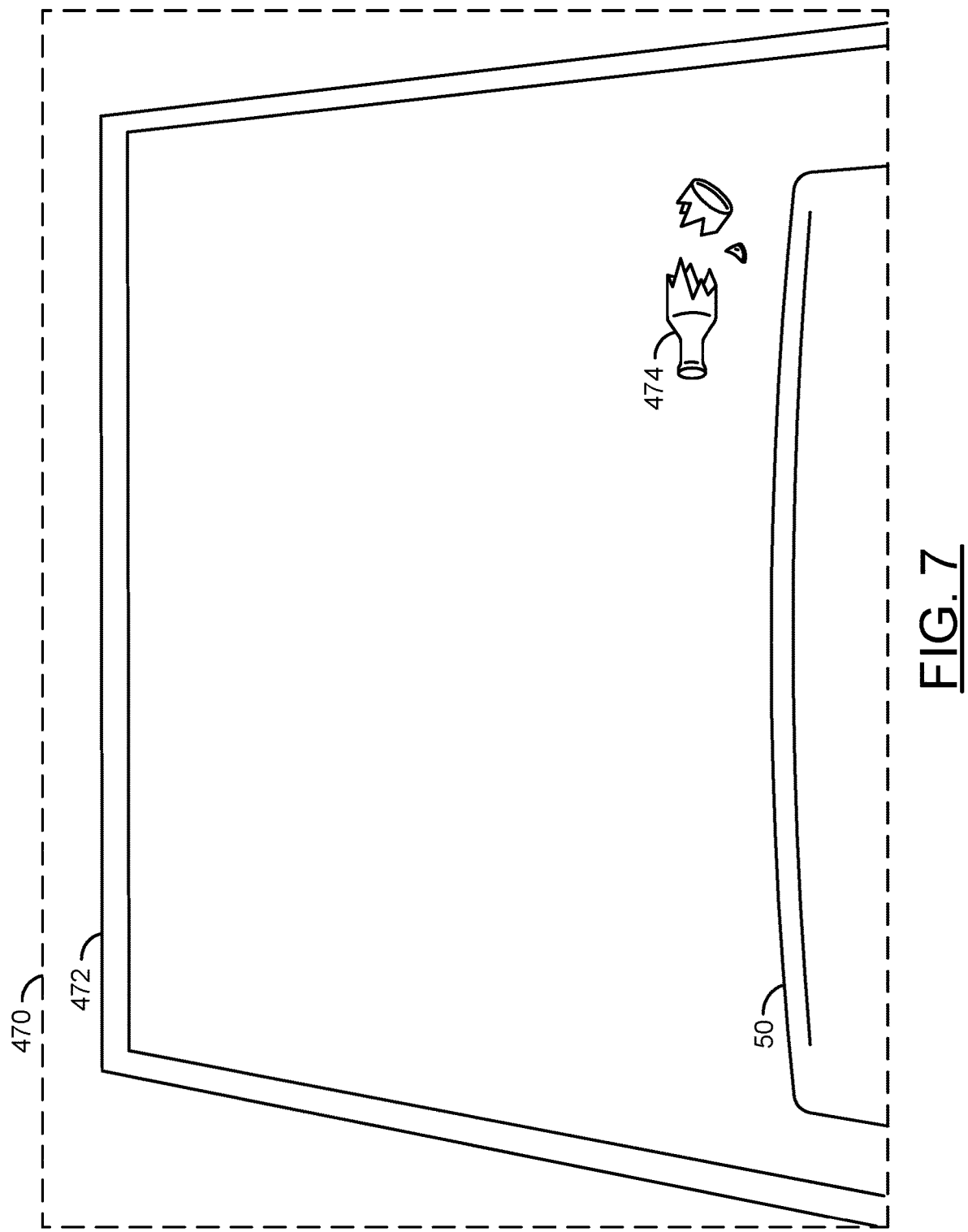
FIG. 7 is a diagram illustrating an example rear view video frame in a parking scenario.

Referring to FIG. 7, a diagram illustrating an example rear view video frame in a parking scenario is shown. An example video frame 470 is shown. The example video frame 470 may be captured by one of the capture devices 102a-102n. For example, the example video frame 470 may be a view corresponding to the lens 112c and/or the portion 282a of the all-round view 282a-282d. The video frame 470 may be a rear view from the perspective of the ego vehicle 50 (e.g., the lens 112c may be mounted above the bumper).

The rear view of the example video frame 470 may comprise a portion of the ego vehicle 50 (e.g., the bumper), a parking spot boundary 472 and a broken bottle 474. The parking spot 472 may be an example of a location that the driver 202 does not have control over (e.g., a public location). The driver 202 may prefer for the infotainment unit 400 to display the rear view similar to the example video frame 470 when backing into a parking spot. For example, using the rearward view of the example video frame 470, the driver 202 may be able to see the broken bottle 474 (e.g., a potential hazard) and choose a different parking spot.

In order to enable the apparatus 100 to automatically select the rear view when backing into the parking spot 472, the driver 202 may select the rearward view in the configuration mode. The driver 202 may select one of the buttons 410a-410f to manually switch to the rearward view (e.g., the manual switching and/or saving features may be enabled at a low speed most drivers use to pull into a parking spot). To set the rearward view as a desired preference view when backing into the parking spot 472, the driver 202 may press the save button 412. In response to the save button 412, the processors 106a-106n may store in the database 174 the precise location of the ego vehicle 50 (e.g., corresponding to the parking spot 472), the gear of the ego vehicle 50 (e.g., reverse) and the selected video (e.g., the rear view similar to the example video frame 470). In some embodiments, where the lens 112c is capable of being manually moved (e.g., angled up and down), the entry in the database 174 may further store the angle of the lens 112c. To determine the precise location of the ego vehicle 50, the processors 106a-106n may perform the localization using the invariant image features 460a-460p as described in association with FIG. 6 (e.g., the processors 106a-106n may constantly be extracting the image features from the captured video frames). For example, an unreliable image features such as the bottle 474 may be ignored (e.g., rejected) for the purposes of localization.

During the regular use mode of operation, the processors 106a-106n may continually extract the image features from the incoming video frames. The extracted image features (e.g., the current and/or incoming invariant image features 460a-460p) may be compared to the entries in the database 174 to determine a localization match to the database 174. For example, when the driver 202 backs into the parking spot 472, the processors 106a-106n may find a match to the entry in the database 174 based on the invariant image features 460a-460p stored. If the current gear of the ego vehicle 50 is in reverse (e.g., a match to the stored status entry in the database 174), then the apparatus 100 may cause one or more of the displays 118a-118n to switch to the rearward view. If the gear of the ego vehicle 50 is forward, then the criteria does not match the rearward view and no automatic change of view may be performed.

Generally, the localization may be for a precise, specific location. For example, if the apparatus 100 detects the parking spot 472, then the change of view may be performed but if the ego vehicle 50 is pulling into another parking spot no change of view may be performed because the two parking spots have different locations. In some embodiments, the localization may be generalized to a region. For example, the driver 202 may prefer to change to the rearward view of the example video frame 470 in any parking spot in a parking lot (e.g., the driver 202 may not park in the same parking spot 472 each time). For example, the GPS coordinates may be used to define a region (e.g., an entire parking lot). In one example, when the ego vehicle 50 is within the region, anytime the gear of the ego vehicle 50 (e.g., the current vehicle status) matches the database entry (e.g., the stored vehicle status) then the apparatus 100 may perform the change of view. In another example, when the ego vehicle 50 is within the region, the invariant image features 460a-460p may be considered a close enough match to any other parking spot and the apparatus 100 may perform the change of view (e.g., the painted parking lines for each parking spot may be substantially similar in the same parking lot. For example, when the ego vehicle 50 is located in the region, the processors 106a-106n may use a lower threshold for determining whether the current invariant image features 460a-460p match the stored invariant image features in order to enable detecting similar parking spots to trigger the automatic view switching.

Figure 8:
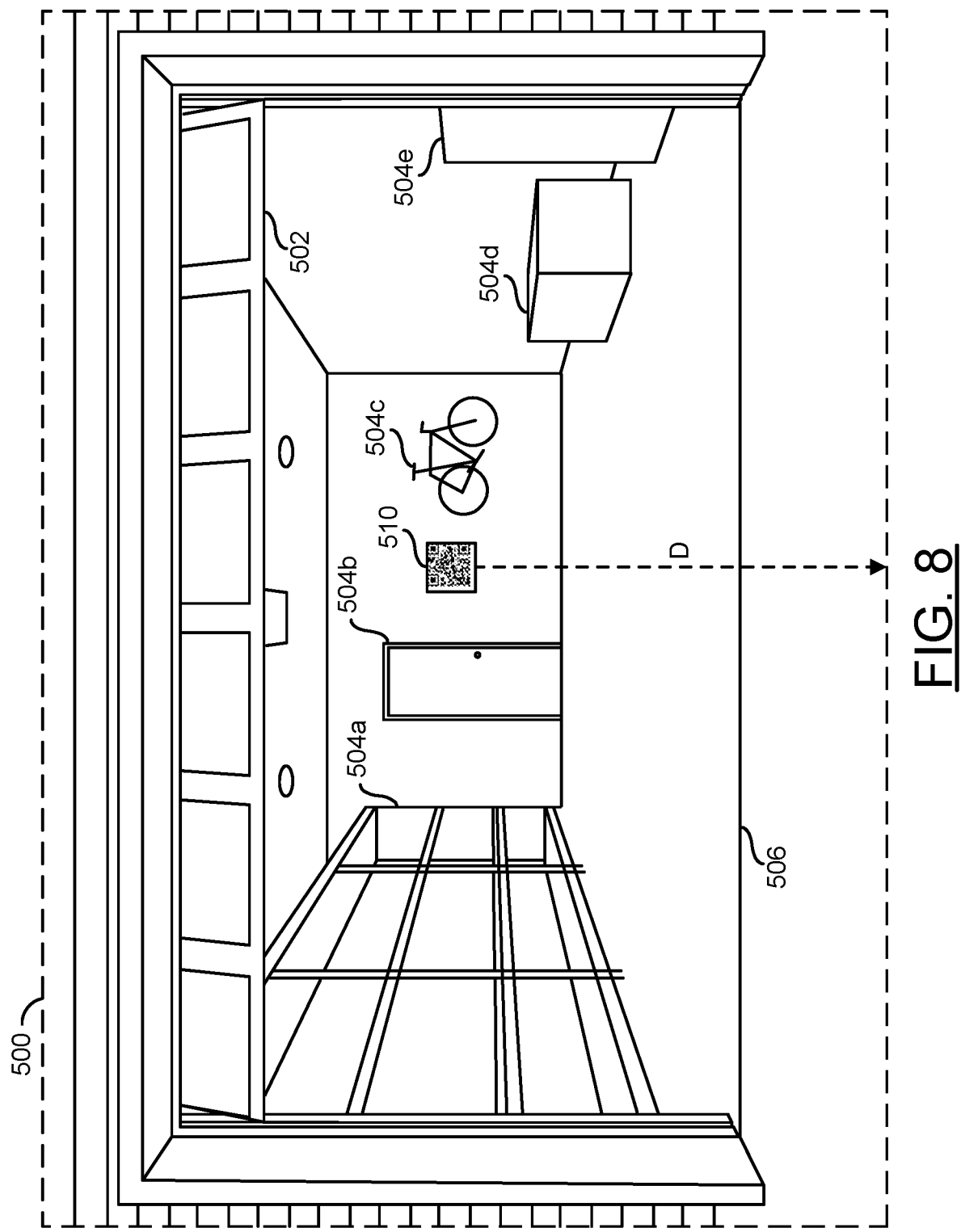
FIG. 8 is a diagram illustrating calculating a distance based on a reference marker in a video frame.

Referring to FIG. 8, a diagram illustrating calculating a distance based on a reference marker in a video frame is shown. An example video frame 500 is shown. The example video frame 500 may be captured by one of the capture devices 102a-102n. For example, the example video frame 500 may be a view corresponding to the front lens 112e and/or the portion 282c of the all-round view 282a-282d. The video frame 500 may be a forward view from the perspective of the ego vehicle 50.

The forward view of the example video frame 500 may comprise a garage door 502, objects 504a-504e, a garage 506 and a unique marker 510. The garage 502 may be an example of a location that the driver 202 does have control over (e.g., a private location that the driver 202 has the freedom to change). In the example shown, the object 504a may be storage shelves, the object 504b may be a door, the object 510c may be a bicycle, the object 504d may be a box and the object 504e may be a box. In the example shown, the unique marker 510 may be a QR code. Generally, the unique marker 510 may be unique amongst markers used by the apparatus 100 (e.g., but not universally unique so other users in other cars that implement the apparatus 100 may use similar looking markers). In another example, the unique marker 510 may be a particular shape (e.g., a circle, a triangle, etc.). In yet another example, the unique marker 510 may be a picture (e.g., a logo). The design of the unique marker 510 may be varied according to the design criteria of a particular implementation.

The apparatus 100 may be configured to detect the unique marker 510. The processors 106a-106n may use the unique marker 510 as a known reference location for calculating a location from a distance. The unique marker 510 may be used in private areas where the user has full control. The unique marker 510 may be installed in a specific location (e.g., with in the garage 506). For example, the unique marker 510 may be set up at a particular location by a user (e.g., the driver 202). The processors 106a-106n may be configured to use the unique marker 510 for precise localization. Depending on the size of the unique marker 510 and/or the field of view of the camera, the localization may be very accurate.

A distance D is shown. The distance D may represent a distance from the unique marker 510 to the lens 112e that captured the video frame 500. The processors 106a-106n may be configured to determine a real-world distance of the ego vehicle 50 from the unique marker 510 by performing calculations based on the distance D detected in the example video frame 500, the size of the ego vehicle 50 and/or the location of the lenses 112a-112n on the ego vehicle 50. The distance D may be used to determine the precise localization of the ego vehicle 50. In the example shown, one distance D is measured. However, multiple cameras (e.g., a stereo pair) and/or multiple measurements (e.g., to multiple unique markers) may be performed to determine the precise location of the ego vehicle 50. In some embodiments, the processors 106a-106n may determine the precise location of the ego vehicle 50 using the unique marker 510 as described in "Localization and navigation using QR code for mobile robot in indoor environment" by Huijuan Zhang, et al. (2015 IEEE International Conference on Robotics and Biomimetics (ROBIO), Dec. 6-9, 2015), appropriate portions of which are hereby incorporated by reference.

The processors 106a-106n may be configured to use the unique marker 510 similar to the invariant image markers 460a-460p. The unique marker 510 may represent a reference object that may be stored and used to compare to a current detection of the unique marker 510 in a current video frame. The size and/or shape of the unique marker 510 may be compared to the current video frames to determine the precise localization of the ego vehicle 50.

In some embodiments, the unique marker 510 may be used instead of the invariant image features 460a-460p (e.g., once the unique marker 510 is detected, the computational cost of detecting the image features may be saved). In some embodiments, the unique marker 510 may be used in addition to the invariant features 460a-460p to determine the localization of the ego vehicle 50. Generally, using the unique marker 510 may enable more reliable and/or accurate localization.

Figure 9:
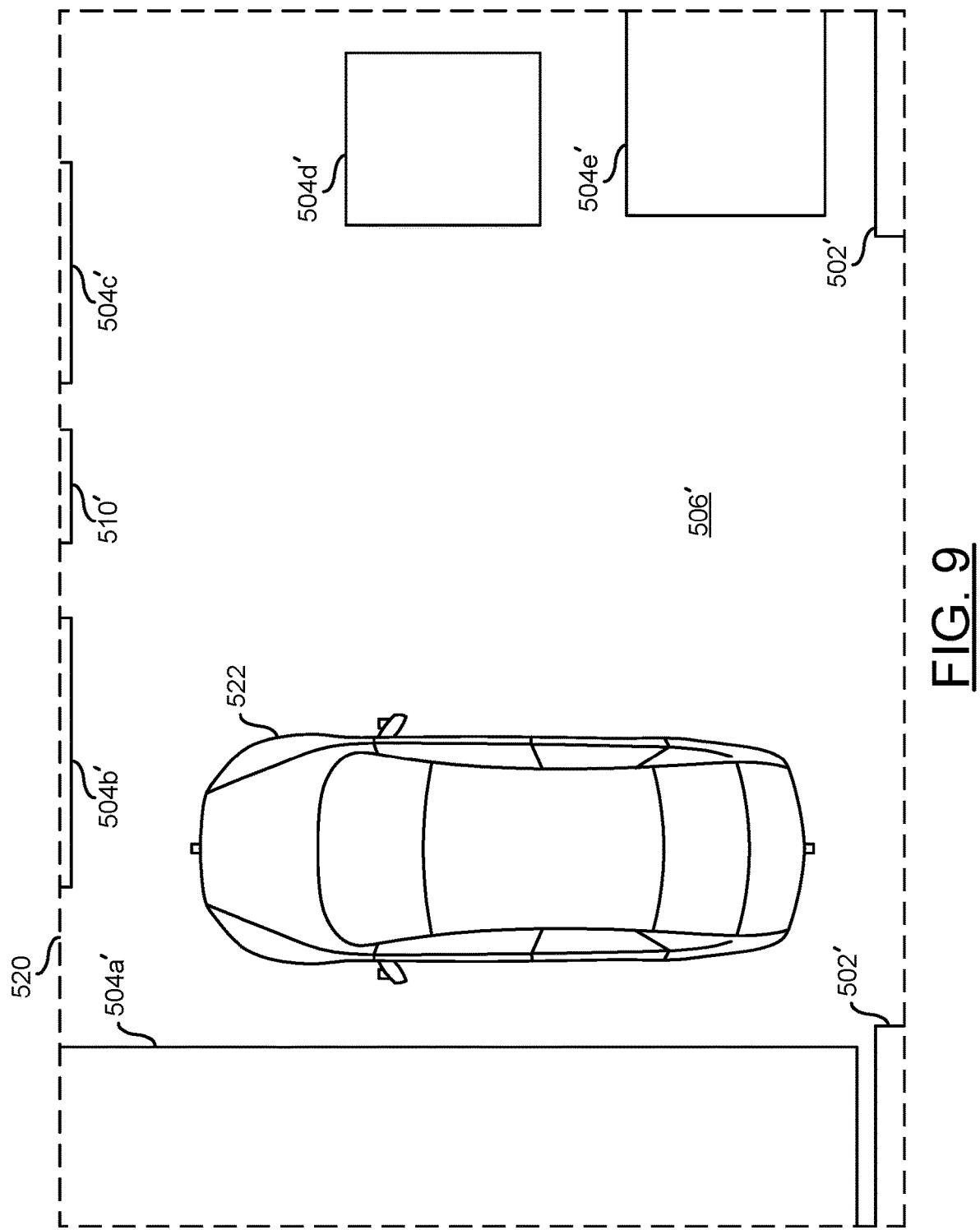
FIG. 9 is a diagram illustrating an example AVM view video frame.

Referring to FIG. 9, a diagram illustrating an example AVM view video frame is shown. An example video frame 520 is shown. The example video frame 520 may be captured by more than one of the capture devices 102a-102n and stitched together by the processors 106a-106n. For example, the example video frame 520 may be a view corresponding to the all-round view 282a-282d.

The all-round view 282a-282d shown in the example video frame 520 may comprise the garage door 502', objects 504a'-504e', the garage 506' and a unique marker 510' shown from a top-down perspective. A vehicle representation 522 is shown. The vehicle representation 522 may be an image overlaid onto the example video frame 520 that represents the location of the ego vehicle 50. For example, the capture devices 102a-102n may not capture a view of the top of the ego vehicle 50, but the vehicle representation 522 may be added to the example video frame 520 in order to provide a spatial relationship of the ego vehicle 50 to the example video frame 520 (e.g., to assist the driver 202 in understanding the orientation of the ego vehicle 50 with respect to the video frame 520). In some embodiments, the vehicle representation 522 may be statically located in the top down view (e.g., centered in the video frame) and as the ego vehicle 50 moves, the rest of the video frame may change based on the video data captured by the capture devices 102a-102n.

In an example, the driver 202 may prefer to use the forward view of the example video frame 500 (shown in association with FIG. 8) when approaching the garage 506, but then may want to change to the top down view of the example video frame 520 when the ego vehicle 50 enters the garage 506. The decision module 158 may use the unique marker 510 as a reference position to determine when the ego vehicle 50 crosses the threshold of the garage door 502 to enter the garage 506. The unique marker 510 may be used by the processors 106a-106n to determine the precise location of the ego vehicle 50. When the distance to the unique marker 510 matches the stored location entry in the database 174 that corresponds to location of entering the garage door 502, then the processors 106a-106n may present the top down view to the particular one of the displays 118a-118n.

Figure 10:
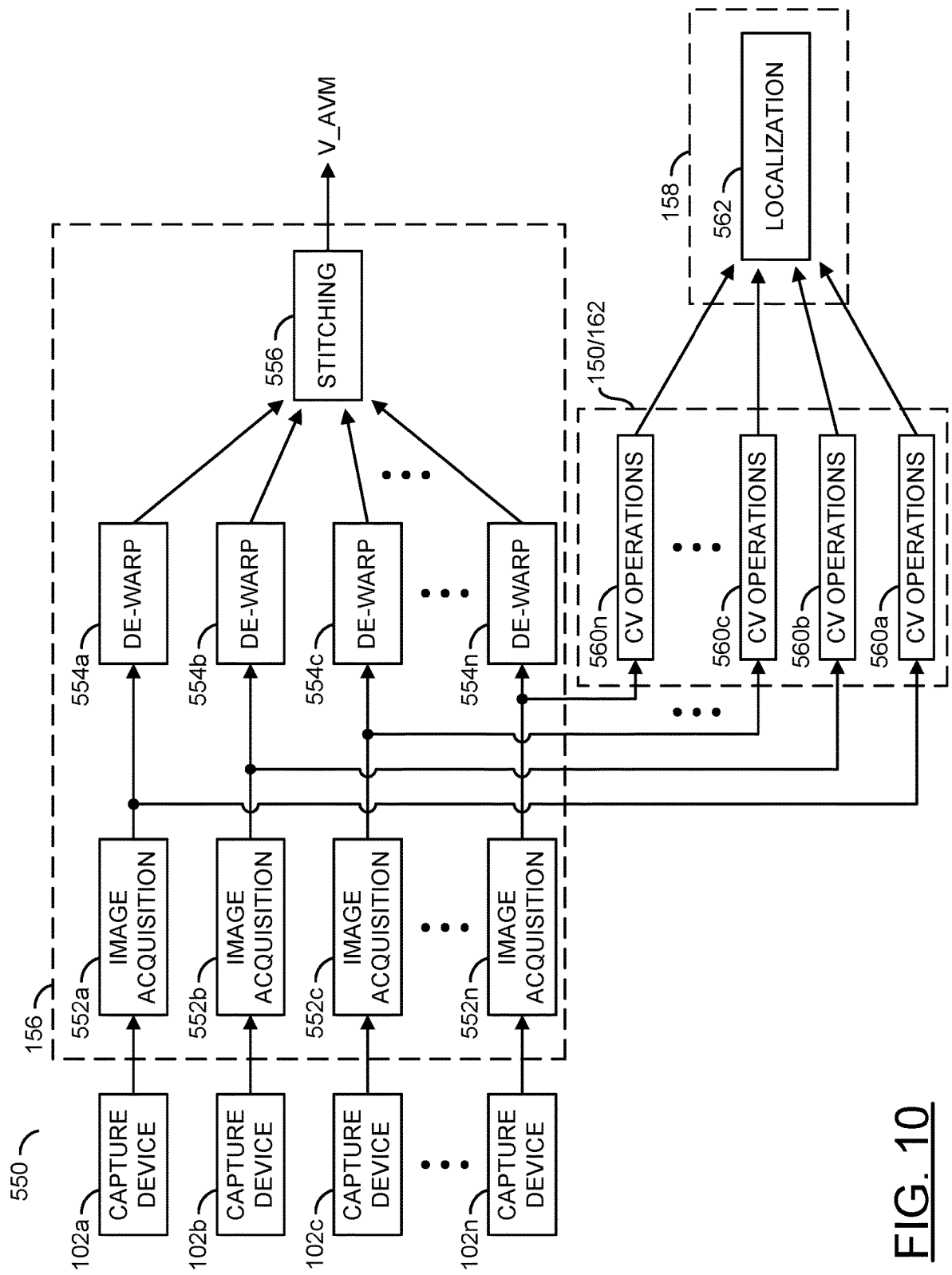
FIG. 10 is a diagram illustrating determining localization during image acquisition.

Referring to FIG. 10, a diagram illustrating determining localization during image acquisition is shown. A representation of the image acquisition process 550 by the apparatus 100 is shown. The image acquisition process 550 may comprise the capture devices 102a-102n, the video processing pipeline 156, the CNN module 150, the decision module 158 and/or the computer vision pipeline portion 162. For an example where the apparatus 100 generates the all-round view 282a-282n, four of the capture devices 102a-102n may be implemented and an output signal (e.g., V_AVM) may be generated as one of the signals VOUT_A-VOUT_N to provide the dewarped and stitched together single bird's-eye view.

The video processing pipeline 156 may comprise blocks (or circuits) 552a-552n, blocks (or circuits) 554a-554n and/or a block (or circuit) 556. The blocks 552a-552n may implement image acquisition modules. The blocks 554a-554n may implement dewarping modules. The block 556 may implement a video stitching module. In embodiments implementing the video processing pipeline portion 162, the video processing pipeline portion 162 may be within the video processing pipeline 156. The image acquisition modules 552a-552n, the dewarping modules 554a-554n and/or the video stitching module 556 may each be conceptual blocks that may be comprised of various circuitry, logic and/or sub-modules. The conceptual blocks may represent a flow of data through the video pipeline 156 for the purpose of generating the all-round view 252a-252d. The video pipeline 156 may comprise other components and/or interconnections (not shown). The number, type and/or arrangement of the components of the video processing pipeline 156 may be varied according to the design criteria of a particular implementation.

The capture devices 102a-102n may be configured to capture current video frames (e.g., record video as the ego vehicle 50 drives around the environment). The current incoming video frames (e.g., the signals FRAMES_A-FRAMES_N) may be transmitted to the video processing pipeline 156. The image acquisition modules 552a-552n may each be configured to receive the current video frames from one of the capture devices 102a-102n. The image acquisition modules 552a-552n may perform various video processing operations. For example, the image acquisition modules 552a-552n may be configured to perform encoding, enhancements, downscaling, packetizing, compression, conversion, blending, synchronizing and/or other video operations. The image acquisition modules 552a-552n may be configured to present the processed video frames to the dewarping modules 554a-554n, the CNN module 150 and/or the computer vision pipeline portion 162.

The dewarping modules 554a-554n may be configured to receive the processed video frames from the image acquisition modules 552a-552n. The dewarping modules 554a-554n may be configured to correct distortion in the processed video frames. For example, the dewarping modules 554a-554n may be configured to perform rolling shutter correction, stabilizing, wide angle lens correction, etc. For example, the dewarping modules 554a-554n may be configured to correct each of the views 282a-282d to provide a rectilinear video frame. The dewarped video frames may be presented to the video stitching module 556.

The video stitching module 556 may be configured to receive the dewarped video frames from the dewarping modules 554a-554n. The video stitching module 556 may be configured to combine dewarped video frames to generate a video frame that combines multiple fields of view into a stitched video frame. The stitched video frame may comprise a relatively seamless attachment of multiple dewarped video frames to provide a field of view that has more video data than any one of the fields of view captured by any one of the individual capture devices 102a-102n. For example, the stitched video frame may be the all-round view 282a-282n shown as the example video frame 520 in association with FIG. 9.

The localization operations may be performed in parallel with the video processing operations in the video processing pipeline 156. In the example shown, the processed video frames generated by the image acquisition modules 552a-552n may be presented to the CNN module 150 and/or the computer vision pipeline portion 162. In some embodiments, the dewarped video frames generated by the dewarping modules 554a-554n may be presented to the CNN module 150 and/or the computer vision pipeline portion 162 (e.g., objects and/or image features may be more easily recognized in a dewarped video frame). For example, the image acquisition process 550 may be configured to generate bird's-eye view and have extended functionality of video analysis to determine a precise localization.

The CNN module 150 and/or the computer vision pipeline portion 162 may comprise blocks (or circuits) 560a-560n. The blocks 560a-560n may be various modules configured to perform computer vision operations. In the example shown, the computer vision operations may be optimized for image feature detection (e.g., extracting the image features 460a-460p, 462a-462f and/or 464a-464k from the current video frames). The CNN module 150 and/or the computer vision pipeline portion 162 may comprise various modules each configured and/or tuned for a particular type of computer vision operations (not shown). The number, type and/or arrangement of the components and/or modules of the CNN module 150 and/or the computer vision pipeline portion 162 may be varied according to the design criteria of a particular implementation.

The computer vision operation modules 560a-560n may be configured to implement a standard QR code identification of the processed (or dewarped) video frames. The computer vision operation modules 560a-560n may be further configured to implement feature extraction of the processed (or dewarped) video frames. The additional processing required to extract QR codes position and/or image features may run on the onboard processing engine of the processors 106a-106n, which is also responsible for the generation of the all-round view 282a-282d (e.g., no additional processing systems are needed and all operations are performed on-chip). The information extracted by the computer vision operations modules 560a-560n (e.g., the image features and/or the unique marker 510) may be presented to the decision module 158.

The decision module 158 may comprise a block (or circuit) 562. The block 562 may implement a localization module. The localization module 562 may be configured to determine the precise location of the ego vehicle 50. The decision module 158 may comprise other modules (not shown). The other modules may be implemented for making various other decisions (e.g., collision avoidance, lane departure assistance, autonomous driving, etc.). The number, type and/or arrangement of the modules and/or components of the decision module 158 may be varied according to the design criteria of a particular implementation.

The localization module 562 may be configured to determine which of the image features are invariant, movable and/or unreliable. The localization module 562 may be configured to compare the image features and/or unique marker 510 detected in the processed (or dewarped) video frames (e.g., the current video frames) with the stored image features in the entries in the database 174. Based on the comparison, the localization module 562 may provide precise localization with respect to the features and therefore the precise position of the ego vehicle 50.

Figure 11:
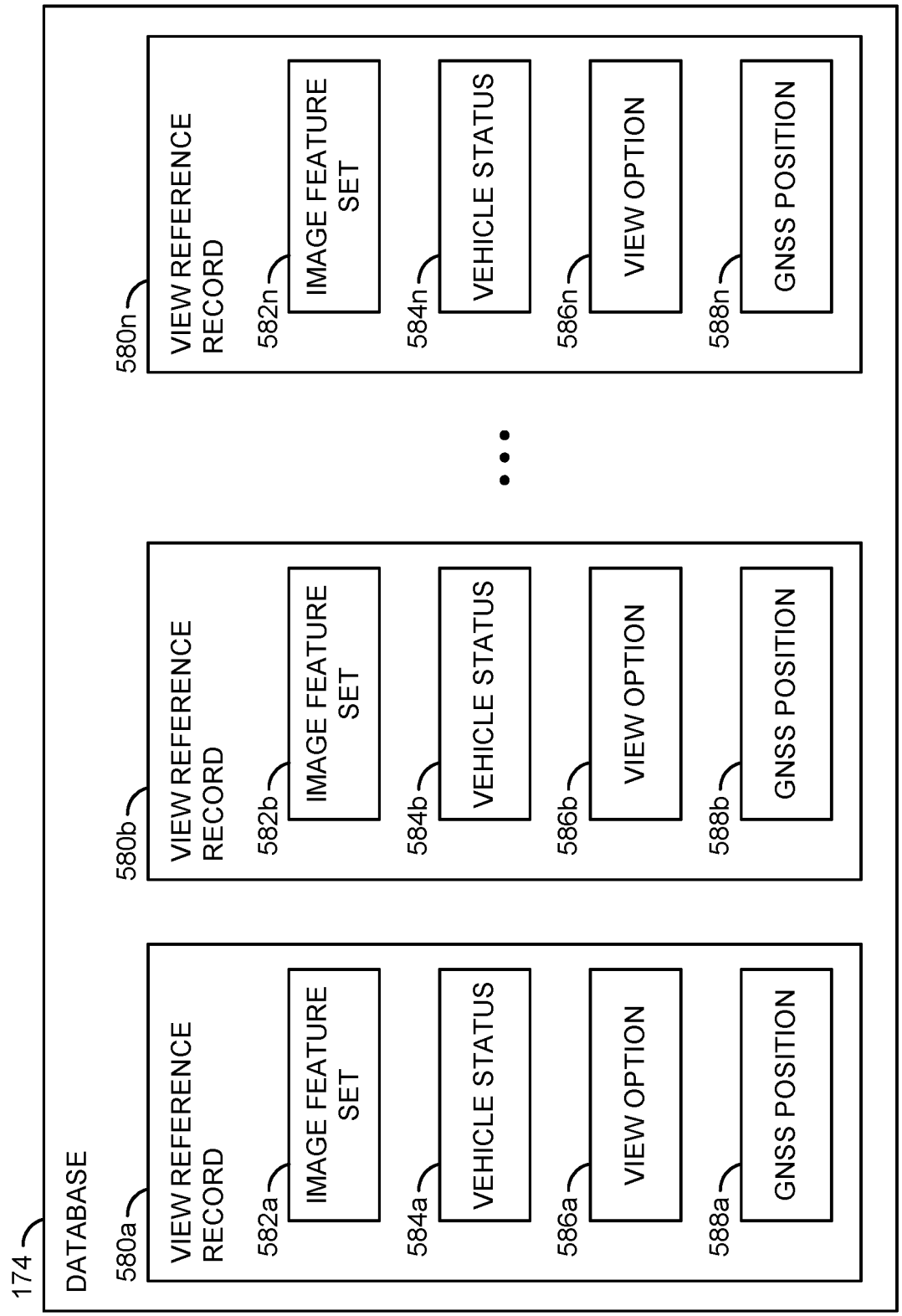
FIG. 11 is a block diagram illustrating a database for view reference records.

Referring to FIG. 11, a block diagram illustrating a database for view reference records is shown. The database 174 is shown. The database 174 may comprise blocks (or circuits or modules) 174. The blocks 580a-580n may be view reference records. The view reference records may be entries stored by the database 580a-580n. The view reference records may be the entries that correspond to automatically switching the displays 118a-118n in the regular use mode of operation. The database 174 may comprise other types of entries (not shown).

The view reference records 580a-580n may each comprise one of the blocks (or circuits or modules) 582a-582n, one of the blocks (or circuits or modules) 584a-584n, one of the blocks (or circuits or modules) 586a-586n and/or one of the blocks (or circuits or modules) 588a-588n. The blocks 582a-582n may be adapted to store an image feature set. The blocks 584a-584n may be adapted to store a vehicle status. The blocks 586a-586n may be adapted to store a view option. The blocks 588a-588n may be adapted to store a GNSS position. The view reference records 580a-580n may comprise other storage modules. The number, type and/or arrangement of the storage for each of the view reference records 580a-580n may be varied according to the design criteria of a particular implementation.

Each of the view reference records 580a-580n may comprise storage of one of the image features sets 582a-582n. The image feature sets 582a-582n may be the stored invariant image features 460a-460p (and, in some cases, the movable image features 462a-462f) and/or the unique marker 510 that may be used for identifying a precise location. Each of the stored image feature sets 582a-582n may comprise different invariant image features 460a-460p and/or the unique marker 510 in order to provide a reference for comparison with the current invariant image features 460a-460p and/or the unique marker 510 of the current video frames. For example, when the image features 460a-460p and/or the unique marker 510 of a current video frame matches one of the stored image feature sets 582a-582n, then the corresponding one of the view reference records 580a-580n may be selected.

Each of the view reference records 580a-580n may comprise storage of one of the vehicle status 584a-584n. The stored vehicle status 584a-584n may comprise status information about the ego vehicle 50. In one example, the vehicle status 584a-584n may each store a gear of the ego vehicle 50. For example, even when the image features 460a-460p and/or the unique marker 510 of a current video frame matches one of the image feature sets 582a-582n, the corresponding one of the view reference records 580a-580n may not be selected unless the current status of the ego vehicle 50 also matches the corresponding stored vehicle status 584a-584n.

Each of the view reference records 580a-580n may comprise storage of one of the view options 586a-586n. The view options 586a-586n may comprise the view to select for the output to one or more of the displays 118a-118n when the particular one of the view reference records 580a-580n is selected. For example, the processors 106a-106n may determine which of the signals VOUT_A-VOUT_N to provide to which of the displays 118a-118n in response to the particular view options 586a-586n. The view options 586a-586n may be a view preference for a particular one of the display 118a-118n. The view options 586a-586n may be the view preferences selected by the driver 202 by pressing the save (or memorize) button 412.

Each of the view reference records 580a-580n may comprise storage of one of the GNSS positions 588a-588n. In some embodiments, the GNSS positions 588a-588n may provide sufficient precision to enable the apparatus 100 to switch the view on the displays 118a-118n. In some embodiments, the GNSS positions 588a-588n may provide a filter for the view reference records 580a-580n. For example, the GNSS positions 588a-588n may provide a range of locations and the view reference records 580a-580n may be filtered out if the current GNSS position detected by the sensor 114 is not within the range of locations of the GNSS positions 588a-588n. The GNSS positions 588a-588n may be used as an initial filter to exclude some of the view reference records 580a-580n from consideration, in order to save computations by the processors 106a-106n.

Similarly, the range of locations provided by the GNSS positions 588a-588n may be used to delete the corresponding database entries 580a-580n when the reset button 414 is pressed. For example, if the sensor 114 provides a GNSS coordinate that is within the ranges provided by the GNSS positions 588i-588k, then when the reset button 414 is pressed, the processors 106a-106n may delete the corresponding view reference records 580i-580k.

In an example, the processors 106a-106n may receive current video frames. The processors 106a-106n may compare the current GNSS location from the sensor 114 to the GNSS positions 588a-588n. For example, if the current GNSS coordinates are not within the GNSS positions 588e-588n, then the database entries 580e-580n may be filtered out (e.g., removed from consideration). Next, the interface 104 may provide the current gear of the ego vehicle 50 to the processors 106a-106n. For example, if the current gear is forward, and the vehicle status 584a is forward, the vehicle status 584b is forward, the vehicle status 584c is reverse and the vehicle status 584d is reverse, then the database entries 588c-588d may also be filtered out. Due to the initial filtering using the vehicle status and the GNSS position, only the view reference records 580a-580b may remain for consideration. The current invariant image features 460a-460p may then be compared to the image feature sets 582a-582b. If neither of the image feature sets 582a-582b match the current invariant image features 460a-460p, then the apparatus 100 may not automatically switch the view. If the image feature set 582*a* matches the currently detected invariant image features 460*a*-460*p*, then the view reference record 580*a* may be selected. The view(s) stored in the view option 586*a* may be used by the processors 106*a*-106*n* to automatically change the view for one or more of the displays 118*a*-118*n*.

Figure 12:
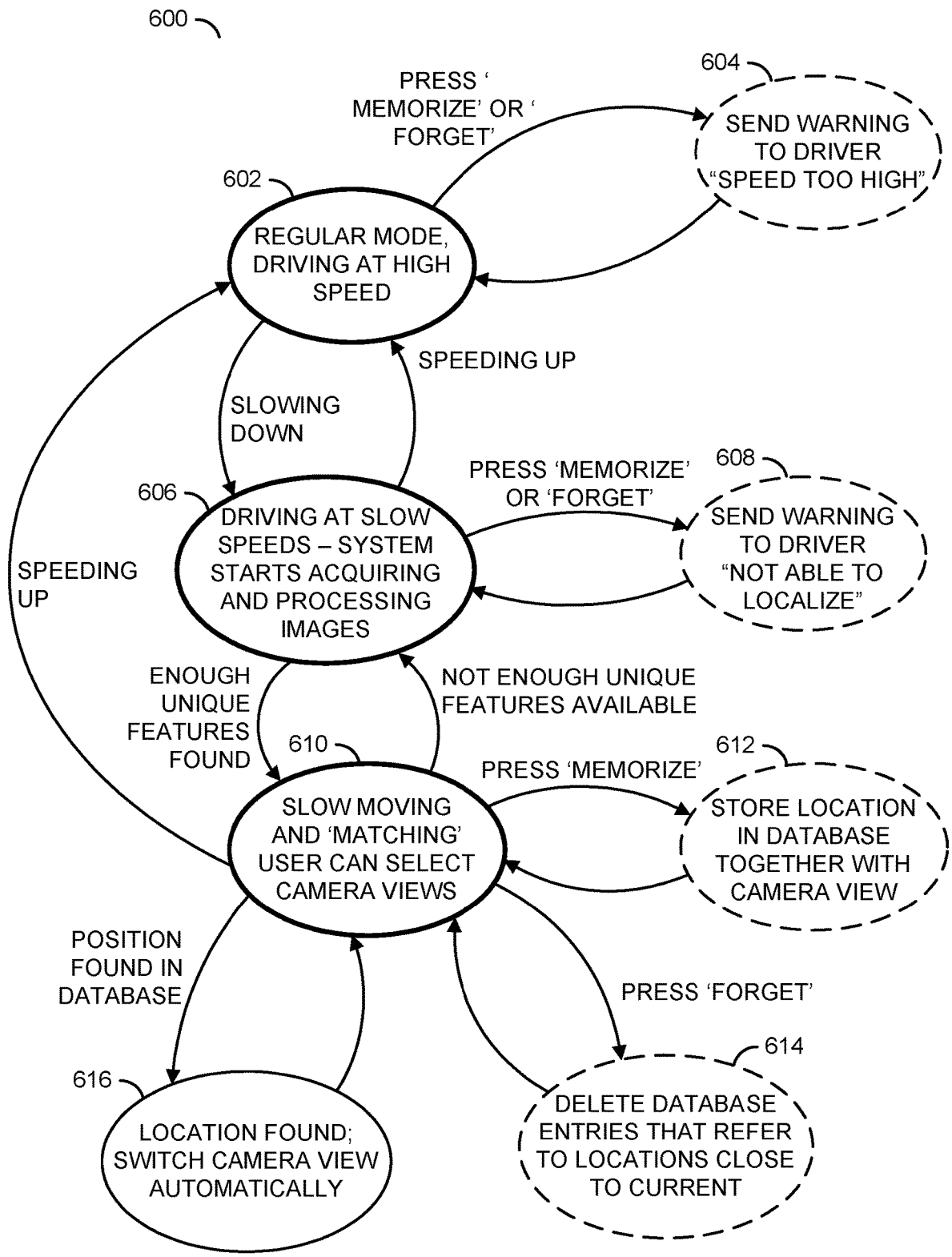
FIG. 12 is a state diagram illustrating a method for selecting a view for a display in response to a localization.

Referring to FIG. 12, a state diagram illustrating a method 600 for selecting a view for a display in response to a localization is shown. The method 600 may comprise a step (or state) 602, a step (or state) 604, a step (or state) 606, a step (or state) 608, a step (or state) 610, a step (or state) 612, a step (or state) 614 and/or a step (or state) 616. The states 602, 606, 610 and/or 616 may be the apparatus 100 operating in the regular mode of operation. The states 604, 608, 612 and 614 may be the apparatus 100 operating in the configuration mode of operation. Generally, the bolded states 602, 606 and/or 610 may be states that the method 600 may remain in for a long time and the states 604, 608, 612, 614 and/or 616 may represent states in which the method 600 may move to then go back to the bolded states 602, 606 and/or 610.

In the state 602, the apparatus 100 may operate in the regular mode of operation and the interface 104 may report to the processors 106*a*-106*n* that the ego vehicle 50 is driving at a high speed (e.g., above the threshold speed for locking out inputs from the infotainment system 400). If the save button 412 and/or the reset button 414 are pressed, then the method 600 may move to the state 604. In the state 604, the processors 106*a*-106*n* may generate a warning (e.g., by presenting the signal VCTRL) that the speed of the ego vehicle 50 is too high (e.g., a message on the displays 118*a*-118*n*, an audible warning, etc.). Next, the method 600 may return to the state 602.

In the state 602, if the interface 104 reports to the processors 106*a*-106*n* that the ego vehicle 50 is slowing down (e.g., to below the threshold speed for locking out the input from the infotainment system 400), then the method 600 may move to the state 606. For example, the method 600 may remain in the state 602 (e.g., the ego vehicle 50 is in motion and at a high speed) until an event is recognized. If the event is 'slowing down' (e.g., detected by analysis the data coming from the CAN bus measuring vehicle speed), then the method 600 may move to the state 606. In an example, the slow speed threshold may be approximately 10 km/h.

In the state 606, the ego vehicle 50 may be traveling at the slow speed and the apparatus 100 may begin acquiring and processing the current images using the video processing pipeline 156 (e.g., as shown in association with FIG. 10). For example, the apparatus 100 may switch on the image acquisition process and the feature extractor process. If the save button 412 and/or the reset button 414 are pressed and there are not enough unique and/or identifiable features detected, then the method 600 may move to the state 608. In the state 608, the processors 106*a*-106*n* may generate a warning (e.g., by presenting the signal VCTRL) that the apparatus 100 is unable to perform the localization (e.g., a message on the displays 118*a*-118*n*, an audible warning, etc.). For example, in the state 606, there may not be enough image features or the unique marker 510 available to perform the localization. Next, the method 600 may return to the state 606.

In the state 606, if the processors 106*a*-106*n* detect that the ego vehicle 50 is speeding up (e.g., above the 10 km/h threshold), then the method 600 may return to the state 602. The speed may be reported by the CAN bus of the ego vehicle 50 (e.g., the interface 104).

In the state 606, if there are enough unique features found (e.g., the invariant image features 460*a*-460*p* and/or the unique marker 510), then the method 600 may move to the state 610. In the state 610, the ego vehicle 50 may be traveling at a slow speed (e.g., below the threshold speed) and image features may be matching one of the database entries 580*a*-580*n* (e.g., the driver 202 may select one of the camera views). For example, in the state 610, processors 106*a*-106*n* may be configured to receive from the capture devices 102*a*-102*n* a sufficient number of unique image features to be able to localize the ego vehicle 50 in case the processors 106*a*-106*n* are requested to do so (e.g., the ego vehicle 50 is moving at a low speed and the features acquired by the processors 106*a*-106*n* are being matched with the image feature sets 582*a*-582*n* stored in the database 174).

In the state 610, if the save button 412 is pressed, then the method 600 may move to the state 612. In the state 612, the processors 106*a*-106*n* may create a new entry in the database 174 and store the image features, the vehicle status, the selected view and/or the GNSS coordinate range. Next, the method 600 may return to the state 610.

In the state 610, if the interface 104 reports to the processors 106*a*-106*n* that the ego vehicle 50 is speeding up, then the method 600 may return to the state 602. In the state 610, if the decision module 158 determines that there are no longer enough available unique features for performing the localization, then the method 600 may return to the state 606.

In the state 610, if the reset button 414 is pressed, then the method 600 may move to the state 614. In the state 614, the processors 106*a*-106*n* may delete all of the database entries 580*a*-580*n* that have the GNSS positions 588*a*-588*n* close to the current GNSS location provided by the sensor 114. Next, the method 600 may return to the state 610.

In the state 610, if the position is found in the database 174 (e.g., the detected invariant image features 460*a*-460*p* and/or the unique marker 510 matches one of the stored image feature sets 582*a*-582*n*), then the method 600 may move to the state 616. In the state 616, the location may be found and the processors 106*a*-106*n* may generate the signals VOUT_A-VOUT_N to the displays 118*a*-118*n* to switch to the camera view (e.g., from the view options 586*a*-586*n*) automatically. Next, the method 600 may return to the state 610.

Figure 13:
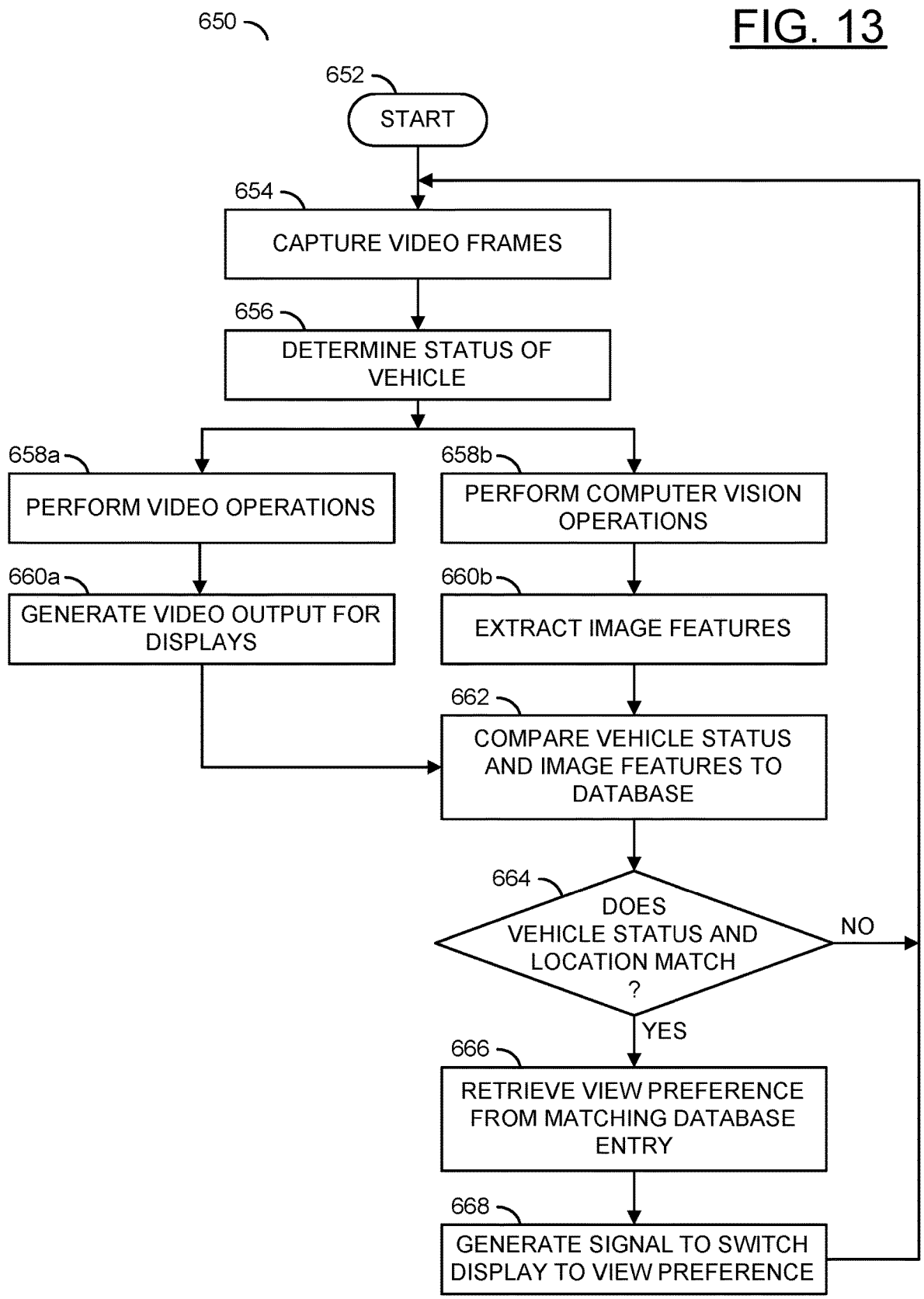
FIG. 13 is a flow diagram illustrating a method for implementing an automatic switchable display.

Referring to FIG. 13, a method (or process) 650 is shown. The method 650 may implement an automatic switchable display. The method 650 generally comprises a step (or state) 652, a step (or state) 654, a step (or state) 656, a step (or state) 658*a*, a step (or state) 658*b*, a step (or state) 660*a*, a step (or state) 660*b*, a step (or state) 662, a decision step (or state) 664, a step (or state) 666, and a step (or state) 668.

The step 652 may start the method 650. In the step 654, the capture devices 102*a*-102*n* may capture the incoming video frames FRAMES_A-FRAMES_N. Next, in the step 656, the processors 106*a*-106*n* may determine the status (e.g., the current gear) of the ego vehicle 50 based on information from the interface 104. Next, the method 650 may move to the steps 658*a*-658*b*.

In the step 658*a*, the processors 106*a*-106*n* may perform the video operations. The video operations may be the video processing performed in the video processing pipeline 156 in order to generate a video output from the input video frames FRAMES_A-FRAMES_N. Next, in the step 660*a*, the processors 106*a*-106*n* may generate the video output signals VOUT_A-VOUT_B for the displays 118a-118n. Next, the method 650 may move to the step 662.

In the step 658b, the processors 106a-106n may perform the computer vision operations. Next, in the step 660b, the processors 106a-106n may extract the image features 460a-460p, 462a-462f and/or 464a-464k from the video frames FRAMES_A-FRAMES_N. Next, the method 650 may move to the step 662. Generally, the steps 658a-660a and the steps 658b-660b may be performed in parallel with each other. For example, the processors 106a-106n may generate the video data from the video frames for viewing while processing the video frames for image feature extraction.

In the step 662, the processors 106a-106n may compare the current vehicle status and the extracted image features 460a-460p to the stored vehicle status 584a-584n and the stored image features 582a-582n in the database 174. Next, the method 650 may move to the decision step 664.

In the decision step 664, the processors 106a-106n may determine whether the current vehicle status and the current image features 460a-460p match both the stored image features 582a-582n and stored vehicle status 584a-584n from one of the database entries 580a-580n. If none of the database entries 580a-580n match, then the method 650 may return to the step 654. If one of the database entries 580a-580n match, then the method 650 may move to the step 666. In the step 666, the processors 106a-106n may retrieve the desired view option 586a-586n from the corresponding database entry that matched. Next, in the step 668m the processors 106a-106n may generate the signals VOUT_A-VOUT_N to switch one or more of the displays 118a-118n to the matching view preference. Next, the method 650 may return to the step 654.

Figure 14:
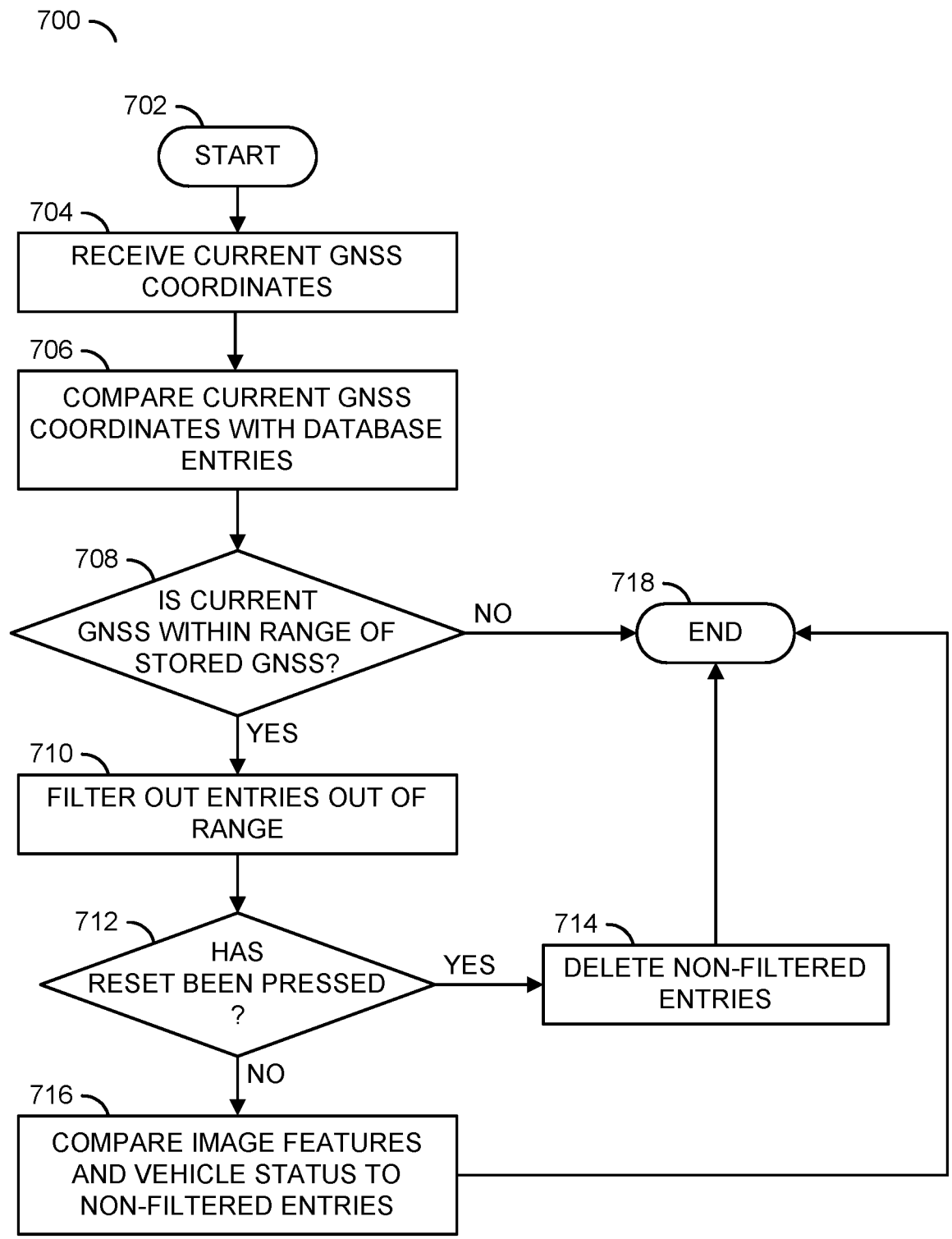
FIG. 14 is a flow diagram illustrating a method for filtering localization entries in a database based in GPS coordinates.

Referring to FIG. 14, a method (or process) 700 is shown. The method 700 may filter localization entries in a database based in GPS coordinates. The method 700 generally comprises a step (or state) 702, a step (or state) 704, a step (or state) 706, a decision step (or state) 708, a step (or state) 710, a decision step (or state) 712, a step (or state) 714, a step (or state) 716, and a step (or state) 718.

The step 702 may start the method 700. In the step 704, the processors 106a-106n may receive the current GNSS/GPS coordinates from the GPS sensor 114 via the interface 104. Next, in the step 706, the processors 106a-106n may compare the current received GNSS/GPS coordinates with the GNSS positions 588a-588n stored in the database entries 580a-580n. Next, the method 700 may move to the decision step 708.

In the decision step 708, the processors 106a-106n may determine whether the current GNSS/GPS coordinates are within the range of coordinates stored in the GNSS positions 588a-588n. If the current GNSS position is not within range of any of the GNSS positions 588a-588n, then the method 700 may move to the step 718. If the current GNSS position is within one or more of the ranges of the GNSS positions 588a-588n, then the method 700 may move to the step 710.

In the step 710, the processors 106a-106n may filter out the database entries 580a-580n that correspond to the GNSS positions 588a-588n that do not match the current GNSS/GPS coordinates. For example, the filtered database entries 580a-580n may be removed from consideration for comparing the current invariant image features 460a-460p to the stored image feature sets 582a-582n. Next, the method 700 may move to the decision step 712.

In the decision step 712, the processors 106a-106n may determine whether the reset button 414 has been pressed (e.g., whether a reset input has been received). If the reset button 414 has been pressed, the method 700 may move to the step 714. In the step 714, the processors 106a-106n may delete the database entries 580a-580n that have not been filtered out in the step 710. For example, the database entries 580a-580n that correspond to the current location of the ego vehicle 50 may be deleted. Next, the method 700 may move to the step 718.

In the decision step 712, if the reset button 414 has not been pressed, the method 700 may move to the step 716. In the step 716, the processors 106a-106n may compare the current image features 460a-460p and the current status of the ego vehicle 50 to the stored image feature sets 582a-582n and the stored vehicle status 584a-584n for the database entries 580a-580n that have not been filtered. For example, the processors 106a-106n may only perform the comparison for the database entries 580a-580n that generally correspond to the current location of the ego vehicle 50. Next, the method 700 may move to the step 718. The step 718 may end the method 700.

Figure 15:
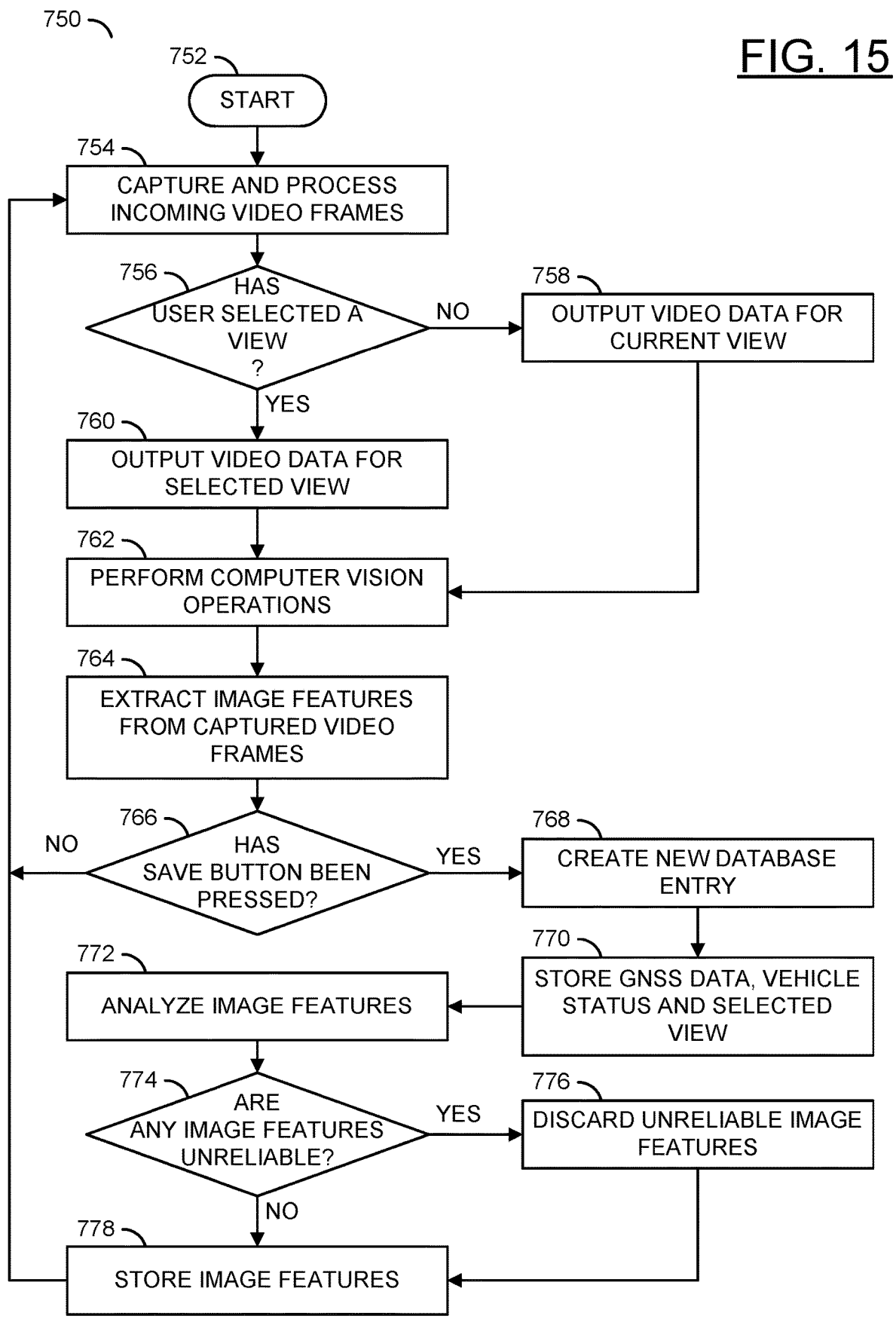
FIG. 15 is a flow diagram illustrating a method for storing invariant image features in response to a user interaction.

Referring to FIG. 15, a method (or process) 750 is shown. The method 750 may store invariant image features in response to a user interaction. The method 750 generally comprises a step (or state) 752, a step (or state) 754, a decision step (or state) 756, a step (or state) 758, a step (or state) 760, a step (or state) 762, a step (or state) 764, a decision step (or state) 766, a step (or state) 768, a step (or state) 770, a step (or state) 772, a decision step (or state) 774, a step (or state) 776, and a step (or state) 778.

The step 752 may start the method 750. In the step 754, the processors 106a-106n may capture and process the incoming video frames FRAMES_A-FRAMES_N. Next, the method 750 may move to the decision step 756.

In the decision step 756, the processors 106a-106n may determine whether the driver 202 has selected a view. For example, the processors 106a-106n may determine whether one of the view selection buttons 410a-410f are providing an input. If the driver 202 has not selected a view, then the method 750 may move to the step 758. In the step 758, the processors 106a-106n may output the video data VOUT_A-VOUT_N for a current view (e.g., no change made to the current output for the displays 118a-118n). Next, the method 750 may move to the step 762.

In the decision step 756, if the driver 202 has selected a view, then the method 750 may move to the step 760. In the step 760, the processors 106a-106n may output the video data VOUT_A-VOUT_B for the selected view based on the input of the buttons 410a-410f. Next, in the step 762, the processors 106a-106n may perform the computer vision operations on the video frames FRAMES_A-FRAMES_N. In the step 764, the processors 106a-106n may extract the image features 460a-460p, 462a-462f and/or 464a-464k from the captured video frames. Next, the method 750 may move to the decision step 766.

In the decision step 766, the processors 106a-106n may determine whether the save/memorize button 412 has been pressed. If the save button 412 has not been pressed, the method 750 may return to the step 754. If the save button 412 has been pressed, the method 750 may move to the step 768. In the step 768, the processors 106a-106n may create a new one of the database entries 580a-580n in the database 174. Next, in the step 770, the processors 106a-106n may store the current GNSS data as the corresponding one of the GNSS positions 588a-588n, store the current vehicle status as the corresponding one of the vehicle status 584a-584n, and store the current view according to the buttons 410a-410f as the corresponding one of the view options 586a-586n. Next, in the step 772, the processors 106a-106n may analyze the image features 460a-460p, 462a-462f and/or 464a-464k. Next, the method 750 may move to the decision step 774.

In the decision step 774, the processors 106a-106n may determine if any of the extracted image features 460a-460p, 462a-462f and/or 464a-464k are unreliable. If the image features 460a-460p, 462a-462f and/or 464a-464k are reliable, the method 750 may move to the step 778. If any of the image features 460a-460p, 462a-462f and/or 464a-464k are unreliable, the method 750 may move to the step 776. In the step 776, the processors 106a-106n may discard the unreliable image features (e.g., the movable image features 462a-462f and/or the unreliable image features 464a-464k). Next, in the step 778, the processors 106a-106n may store the current invariant image features 460a-460p as the corresponding one of the image feature sets 582a-582n. Next, the method 750 may return to the step 754.

Figure 16:
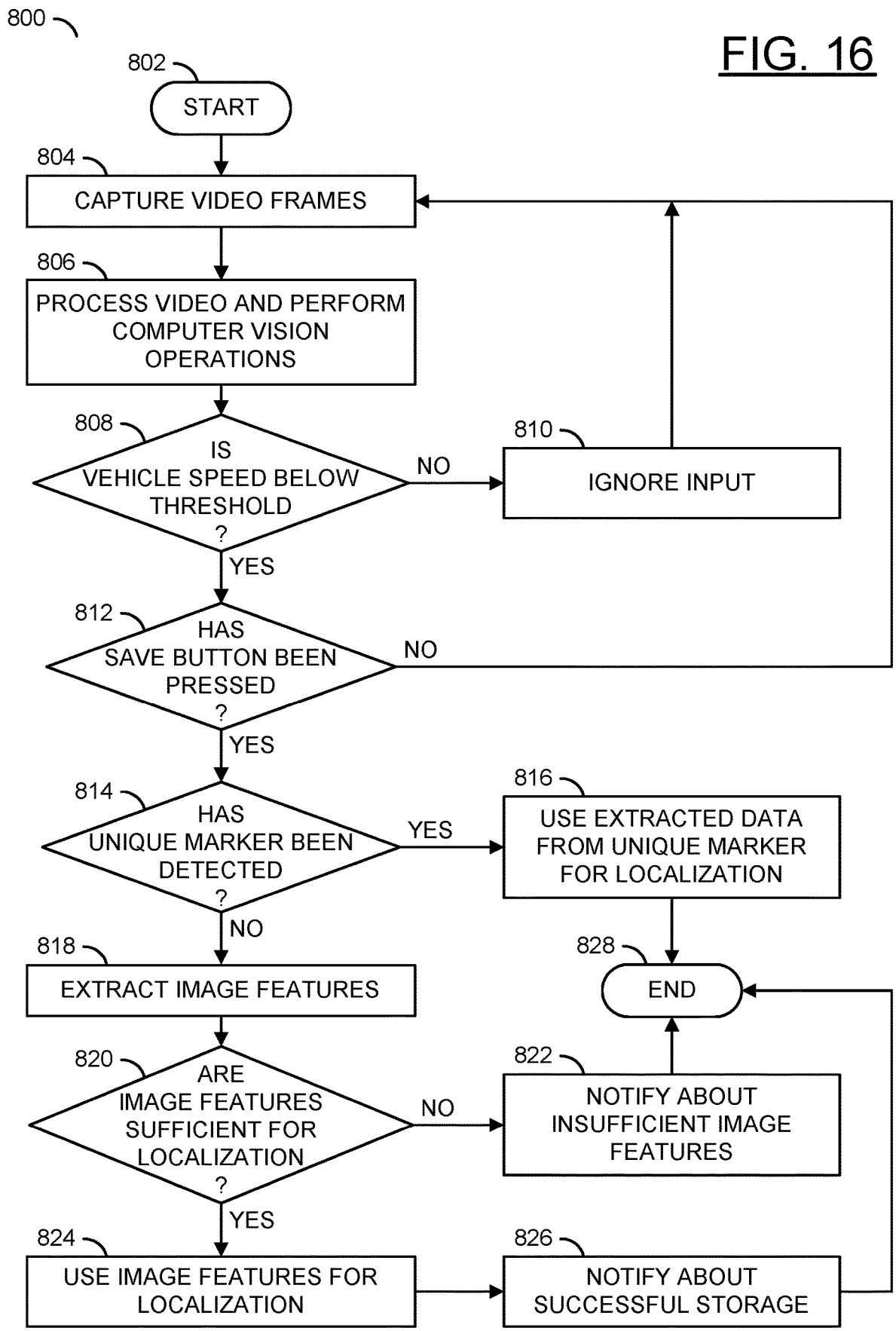
FIG. 16 is a flow diagram illustrating a method for notifying a driver in response to a localization attempt.

Referring to FIG. 16, a method (or process) 800 is shown. The method 800 may notify a driver in response to a localization attempt. The method 800 generally comprises a step (or state) 802, a step (or state) 804, a step (or state) 806, a decision step (or state) 808, a step (or state) 810, a decision step (or state) 812, a decision step (or state) 814, a step (or state) 816, a step (or state) 818, a decision step (or state) 820, a step (or state) 822, a step (or state) 824, a step (or state) 826, and a step (or state) 828.

The step 802 may start the method 800. In the step 804, the apparatus 100 may capture the video frames FRAMES_A-FRAMES_N. Next, in the step 806, the processors 106a-106n may process the video data and perform the computer vision operations. Next, the method 800 may move to the decision step 808.

In the decision step 808, the processors 106a-106n may determine whether the speed of the ego vehicle 50 is below the threshold speed for receiving input from the infotainment system 400. For example, the speed may be received from the interface 104. If the speed is above the threshold, then the method 800 may move to the step 810. In the step 810, the processors 106a-106n may ignore input from the infotainment system 400 (and provide feedback to indicate that no input will be accepted at the current speed). Next, the method 800 may return to the step 804. In the decision step 808, if the speed is below the threshold, then the method 800 may move to the decision step 812.

In the decision step 812, the processors 106a-106n may determine whether the save button 412 has been pressed. If the save button 412 has not been pressed, then the method 800 may return to the step 804. If the save button 412 has been pressed, then the method 800 may move to the decision step 814.

In the decision step 814, the processors 106a-106n may determine whether the unique marker 510 has been detected in the video frames. For example, the computer vision operations may be configured to search the video frames for one of the known patterns of the unique marker 510. If the unique marker 510 has been detected, then the method 800 may move to the step 816. In the step 816, the processors 106a-106n may use the extracted data from the unique marker 510 for determining the localization. Next, the method 800 may move to the step 828. In the decision step 814, if the unique marker 510 has not been detected, then the method 800 may move to the step 818. In the step 818, the processors 106a-106n may extract the invariant image features 460a-460p from the video frames using the computer vision operations. Next, the method 800 may move to the decision step 820.

In the decision step 820, the processors 106a-106n may determine whether there are a sufficient number of the invariant image features 460a-460p to perform localization. If there is an insufficient number of the invariant image features 460a-460p, then the method 800 may move to the step 822. In the step 822, the processors 106a-106n may generate the signal VCTRL in order to provide a notification that there are not enough of the invariant features 460a-460p to store the localization. Next, the method 800 may move to the step 828.

In the decision step 820, if there is a sufficient number of the invariant image features 460a-460p, then the method 800 may move to the step 824. In the step 824, the processors may use the invariant image features 460a-460p for localization (e.g., the current invariant image features 460a-460p may be stored as one of the image feature sets 582a-582n for a new database entry). Next, in the step 826, the processors 106a-106n may generate the signal VCTRL in order to provide a notification about the successful storage of the new database entry 580a-580n. Next, the method 800 may move to the step 828. The step 828 may end the method 800.

The functions performed by the diagrams of FIGS. 1-16 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data corresponding to an exterior view from a vehicle; and
a processor configured to (a) process said pixel data arranged as video frames, (b) generate video data for a display in response to said video frames, (c) store a plurality of view preferences for said display, each view preference corresponding to one or more of (i) a location, (ii) a vehicle status, (iii) a maneuver, and (iv) a portion of said maneuver, when said maneuver comprises more than one portion, (d) determine (i) a current location of said vehicle, (ii) a current status of said vehicle, (iii) a current maneuver being performed, and (iv) which portion of said current maneuver is being performed, and (e) generate an output signal to select a view for said display, wherein (i) said processor switches between a plurality of view preferences associated with said maneuver based on a plurality of precise locations corresponding to a plurality of portions of said maneuver, (ii) said processor determines a current precise location within said maneuver by calculating distances using image-based localization applied to said video frames, (iii) said output signal is generated in response to said current precise location within said maneuver and said current status matching said precise location and said vehicle status, respectively, of a particular one of said plurality of view preferences corresponding to said plurality of portions of said maneuver, and (iv) said view selected is determined based on said particular one of said plurality of view preferences.

2. The apparatus according to claim 1, wherein said maneuver is a low-speed maneuver.

3. The apparatus according to claim 2, wherein said low-speed maneuver comprises pulling into or pulling out of a parking space.

4. The apparatus according to claim 1, wherein:
said processor determines an approximate current location using a GPS sensor; and
at least one of said location and said current location comprises GPS coordinates.

5. The apparatus according to claim 1, wherein said current precise location is determined in response to computer vision operations performed by said processor on said video frames.

6. The apparatus according to claim 5, wherein said computer vision operations are configured to extract image features from said video frames.

7. The apparatus according to claim 6, wherein said image features are compared to stored image features corresponding to said current precise location to determine whether said image features match said stored image features.

8. The apparatus according to claim 7, wherein if said image features match said stored image features, said processor determines that said current precise location matches a corresponding portion of said maneuver within a few centimeters.

9. The apparatus according to claim 6, wherein said image features comprise a unique marker set up at a particular location by a user.

10. The apparatus according to claim 1, wherein said pixel data is received from a plurality of capture devices of said vehicle.

11. The apparatus according to claim 1, wherein said vehicle status and said current status comprise a gear selection of said vehicle.

12. The apparatus according to claim 1, wherein (i) said apparatus further comprises a database, (ii) said database comprises a plurality of stored views, (iii) each of said plurality of stored views comprises one of said plurality of view preferences, a respective location, and a respective vehicle status, (iv) said current location and said current status are compared to said plurality of stored views, and (v) if said current location and said current status are determined to match said respective location and said respective vehicle status of a particular one of said plurality of stored views, then a respective view preference corresponding to said particular one of said plurality of stored views is selected.

13. The apparatus according to claim 12, wherein (i) said plurality of stored views each comprise a GPS coordinate range, (ii) said processor performs a comparison of a current GPS coordinate to said GPS coordinate range as an initial filter for said plurality of stored views, and (iii) said current location and said current status are only compared to said plurality of stored views in said database that have not been filtered out by said comparison of said current GPS coordinate to said GPS coordinate range.

14. The apparatus according to claim 1, wherein in a configuration mode of operation, said processor is configured to perform one or more of (i) receive a view selection input, (ii) generate said output signal to select said view for said display in response to said view selection input, (iii) receive a save preference input, (iv) store said current location, said current status and said view preference based on said view selected as a database entry in response to said save preference input, (v) receive a reset input, and (vi) delete said database entry that corresponds to said current location in response to said reset input.

15. The apparatus according to claim 1, wherein in a regular use mode of operation, said processor is configured to automatically switch said display to said view preference without interaction from a driver.

16. The apparatus according to claim 1, wherein said plurality of view preferences corresponding to said plurality of portions of said maneuver are stored to provide a predefined sequence of views for executing an entire maneuver.

17. The apparatus according to claim 1, wherein said processor is further configured to implement a convolutional neural network (CNN) trained to perform one or more of (i) detect and extract image features from said video frames and (ii) match image features from said video frames to stored image features corresponding to said location to determine whether said image features match said stored image features.

18. A method for assisting a driver during a maneuver comprising:
receiving pixel data corresponding to an exterior view from a vehicle;
processing said pixel data arranged as video frames;
generating video data for a display in response to said video frames;
determining (i) a current location of said vehicle, (ii) a current status of said vehicle, (iii) a current maneuver being performed, and (iv) which portion of said current maneuver is being performed; and
generating an output signal to select a view for said display, wherein (i) a processor is used to switch between a plurality of view preferences associated with said maneuver based on a plurality of precise locations corresponding to a plurality of portions of said maneuver, (ii) said processor determines a current precise location within said maneuver by calculating distances using image-based localization applied to said video frames, (iii) said output signal is generated in response to said current precise location within said maneuver and said current status matching said precise location and a vehicle status, respectively, of a particular one of said plurality of view preferences corresponding to said plurality of portions of said maneuver, and (iv) said view selected is determined based on said particular one of said plurality of view preferences.

19. The method according to claim 18, further comprising storing said plurality of view preferences for said display, each view preference corresponding to one or more of (i) a particular location, (ii) a particular vehicle status, (iii) a particular maneuver, and (iv) a portion of said particular maneuver, when said particular maneuver comprises more than one portion.

20. The method according to claim 19, wherein (i) said current precise location is determined using computer vision operations performed by said processor on said video frames to extract image features from said video frames, and (ii) said image features are compared to stored image features corresponding to said current precise location to determine whether said image features match said stored image features, and when said image features match said stored image features, said processor determines that said current precise location matches a corresponding portion of a low-speed maneuver within a few centimeters.

* * * * *